US012781041B2

(12) United States Patent
Hiwatashi

(10) Patent No.: US 12,781,041 B2
(45) Date of Patent: Nov. 3, 2026

(54) RESIN COMPOSITION, FORMED ARTICLE, KIT, CAR-BORNE CAMERA COMPONENT, CAR-BORNE CAMERA MODULE, AND METHOD FOR MANUFACTURING FORMED ARTICLE

(71) Applicant: MITSUBISHI CHEMICAL CORPORATION, Tokyo (JP)

(72) Inventor: Yuki Hiwatashi, Hiratsuka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 905 days.

(21) Appl. No.: 17/997,856

(22) PCT Filed: May 7, 2021

(86) PCT No.: PCT/JP2021/017450

§ 371 (c)(1), (2) Date: Nov. 3, 2022

(87) PCT Pub. No.: WO2021/225154

PCT Pub. Date: Nov. 11, 2021

(65) Prior Publication Data

US 2023/0159745 A1 May 25, 2023

(30) Foreign Application Priority Data

May 7, 2020 (JP) ................................ 2020-082232

(51) Int. Cl.

| | |
|---|---|
| ***C08F 2/46*** | (2006.01) |
| ***C08F 2/50*** | (2006.01) |
| ***C08G 61/04*** | (2006.01) |
| ***C08J 7/18*** | (2006.01) |
| ***C08L 67/02*** | (2006.01) |
| *B29C 65/16* | (2006.01) |

(52) U.S. Cl.

CPC ................. *C08L 67/02* (2013.01); *C08J 7/18* (2013.01); *B29C 65/16* (2013.01); *C08J 2367/02* (2013.01); *C08J 2463/04* (2013.01); *C08J 2469/00* (2013.01); *C08L 2205/03* (2013.01); *C08L 2310/00* (2013.01)

(58) Field of Classification Search

CPC . C08J 5/043; C08J 7/18; C08J 2463/04; C08J 2469/00; C08J 2367/02; C08K 7/14; C08K 5/0041; G03B 30/00; G02B 1/04; C08L 67/02; C08L 67/00; C08L 69/00; C08L 25/12; C08L 25/10; C08L 63/00; C08L 2205/03; C08L 2310/00; B29C 65/16

USPC ............... 522/109, 1, 6, 189, 184, 71; 520/1

See application file for complete search history.

(56) References Cited

U.S. PATENT DOCUMENTS

| | | | | |
|---|---|---|---|---|
| 10,781,308 | B2 | 9/2020 | Yamanaka et al. | |
| 10,836,113 | B2 | 11/2020 | Yamanaka | |
| 11,390,037 | B2 | 7/2022 | Oka et al. | |
| 2018/0264743 | A1 | 9/2018 | Yamanaka | |
| 2019/0016883 | A1 * | 1/2019 | Yamanaka | B29C 66/9592 |
| 2020/0307112 | A1 | 10/2020 | Oka et al. | |
| 2021/0292547 | A1 | 9/2021 | Yamanaka et al. | |

FOREIGN PATENT DOCUMENTS

| | | | | | |
|---|---|---|---|---|---|
| CN | 108699322 | A | | 10/2018 | |
| EP | 3 974 475 | A1 | | 3/2022 | |
| EP | 4 317 315 | A1 | | 2/2024 | |
| JP | 2008-133341 | A | | 6/2006 | |
| JP | 2008-189764 | A | | 8/2008 | |
| JP | 2013155278 | A | * | 8/2013 | B29C 66/112 |
| JP | 2013155279 | A | * | 8/2013 | |
| JP | 2014-512420 | A | | 5/2014 | |
| JP | 6183822 | B1 | | 8/2017 | |
| JP | WO2017/159381 | A1 | | 9/2017 | |
| JP | 2018-58235 | A | | 4/2018 | |
| JP | 2019-38878 | A | | 3/2019 | |
| JP | 2019-38880 | A | | 3/2019 | |
| JP | 2019-81364 | A | | 5/2019 | |
| JP | WO2019/088058 | A1 | | 5/2019 | |
| JP | WO2019/088073 | A1 | | 5/2019 | |
| WO | WO 2016/117493 | A1 | | 7/2016 | |
| WO | WO-2017146196 | A1 | * | 8/2017 | B29C 66/1142 |
| WO | WO 2020/022208 | A1 | | 1/2020 | |
| WO | WO 2021/225153 | A1 | | 11/2021 | |

OTHER PUBLICATIONS

Nishida et al., JP 2013/155278 Machine Translation, Aug. 15, 2013 (Year: 2013).*
Chinese Office action issued May 15, 2024 in Chinese Patent Application No. 202180030098.3, with unedited machine-generated English translation, 16 pages.
International Search Report and Written Opinion issued on Jun. 22, 2021 in PCT/JP2021/017450 (with English translation), 17 pages.
International Preliminary Report on Patentability and Written Opinion issued on Nov. 8, 2022 in PCT/JP2021/017450 (with English translation), 9 pages.

(Continued)

*Primary Examiner* — Jessica Whiteley
(74) *Attorney, Agent, or Firm* — Oblon, McClelland, Maier & Neustadt, L.L.P.

(57) ABSTRACT

A resin composition may suppress color fading after a weathering test and excel in heat resistance. A formed article may use of such resin composition, as may a kit, a car-borne camera component, a car-borne camera module. A resin composition may include: per 100 parts by mass of a resin component that contains 50 to 95% by mass of a polybutylene terephthalate resin (A), and 5 to 50% by mass of a thermoplastic resin (B) that demonstrates a glass transition temperature, measured with use of a differential scanning calorimeter, higher by 15 to 150° C. than that of the polybutylene terephthalate resin (A); 0.001 to 5 parts by mass of a dye; and 5 to 100 parts by mass of an inorganic filler.

21 Claims, 4 Drawing Sheets

(56) References Cited

OTHER PUBLICATIONS

Combined Chinese Office and Search Report issued Mar. 24, 2023 in Chinese Patent Application No. 202180030096.3 (with English translation), 14 pages.

Extended European Search Report dated Apr. 15, 2024 issued in the corresponding European Patent Application No. 21799829.3, 7 pages.

Combined Chinese Office Action and Search Report issued Dec. 30, 2023 in Chinese Patent Application No. 202180030098.3 (with unedited computer-generated English translation), 15 pages.

Japanese Office Action issued on Jun. 24, 2025 in Japanese Patent Application No. 2022-519628 (with English machine translation), 12 pages.

Office Action dated Dec. 23, 2025, in Japanese Patent Application No. 2022-519628 with English machine translation, 13 pages.

Office Action dated Apr. 21, 2026, in European Patent Application No. 21799829.3 (7 pages).

Decision of Rejection dated Jun. 23, 2026, in Japanese Patent Application No. 2022-519628 with English machine translation, 11 pages.

* cited by examiner (A)

(B)

(A)

(B)

(A)

(B)

RESIN COMPOSITION, FORMED ARTICLE, KIT, CAR-BORNE CAMERA COMPONENT, CAR-BORNE CAMERA MODULE, AND METHOD FOR MANUFACTURING FORMED ARTICLE

CROSS-REFERENCE TO RELATED APPLICATIONS

The present application is the national stage of international application PCT/JP2021/017450, filed on May 7, 2021, and claims the benefit of the filing date of Japanese Appl. No. 2020-082232, filed on May 7, 2020.

TECHNICAL FIELD

This invention relates to a resin composition, a formed article, a kit, a car-borne camera component, a car-borne camera module, and a method for manufacturing a formed article.

BACKGROUND ART

Polybutylene terephthalate resin excels in mechanical strength, chemical resistance and electrical insulation, and also in heat resistance, formability, and recycling efficiency, and has therefore been widely used for components for various equipment.

Recent advancing trend of weight reduction particularly in car components has more strongly demanded replacement of components previously made of metals with resins, or higher level of heat resistance in return for size reduction of resin products. Hence, reinforced thermoplastic resin having a filler such as glass fiber blended therein has been increasingly used. In particular, polybutylene terephthalate resin has been widely used typically for casings for car electronic components, and case of motor components, for its excellent mechanical strength and formability.

Another recent increasing trend relates to a welding process aimed at more efficient productivity, for which laser welding has been increasingly employed for its small influence on electronic components. For example, Patent Literature 1 discloses a resin composition for laser welding used for laser light-assisted welding, the resin composition includes: (A) 100 parts by mass of a thermoplastic polyester-based resin that contains at least one of polybutylene terephthalate homopolymer, polybutylene terephthalate copolymer, polyethylene terephthalate resin or polycarbonate resin; (B) 0.0005 to 0.5 parts by mass of nigrosin; and (C) 0.01 to 2 parts by mass of a coloring matter that contains at least anthraquinone dye C1 having a maximum absorption within the wavelength range from 590 to 635 nm, perinone dye C2 having a maximum absorption within the wavelength range from 460 to 480 nm, and anthraquinone dye C3 having a maximum absorption within the wavelength range from 435 to 455 nm, whose mass ratio given by C1:C2:C3=(24 to 41):(24 to 39):(22 to 46), where C1, C2 and C3 totaling 100 parts by mass.

CITATION LIST

Patent Literature

[Patent Literature 1] JP 6183822 B

SUMMARY OF THE INVENTION

Technical Problem

The present inventors, however, found from our investigations that the dye-containing polybutylene terephthalate resin composition in some cases caused color fading after weathering test. Blending of pigment in place of the dye, although successfully suppressed the color fading, made the resin composition less transmissive, which is therefore unusable typically as a transmissive resin composition for laser welding. In some applications, also the dye-containing resin composition would necessarily be heat resistant. This invention is aimed at solving the issue, and is to provide a resin composition that is suppressed from color fading after weathering test and excels in heat resistance, as well as to provide a formed article, a kit, a car-borne camera component, a car-borne camera module, and a formed article with use of such resin composition.

Solution to Problem

The present inventors conducted research to address the above-mentioned problems, and as a result, discovered that a resin composition that is suppressed from color fading after weathering test and excels in heat resistance could be provided by blending a polybutylene terephthalate resin, a thermoplastic resin that demonstrates a glass transition temperature higher than that of the polybutylene terephthalate resin, and inorganic fiber besides. This led the inventors to the completion of this invention. Specifically, the problems described above are solved by the following means.

<1> A resin composition comprising:

per 100 parts by mass of a resin component that contains 50 to 95% by mass of a polybutylene terephthalate resin (A), and 5 to 50% by mass of a thermoplastic resin (B) that demonstrates a glass transition temperature, measured with use of a differential scanning calorimeter, higher by 15 to 150° C. than that of the polybutylene terephthalate resin (A);

0.001 to 5 parts by mass of a dye; and 5 to 100 parts by mass of an inorganic filler.

<2> The resin composition of <1>, wherein the thermoplastic resin (B) contains a polycarbonate resin.

<3> The resin composition of <1> or <2>, further comprising a reactive compound.

<4> The resin composition of <3>, wherein the reactive compound contains an epoxy compound.

<5> The resin composition of any one of <1> to <4>, wherein the dye is a black dye and/or a black dye composition.

<6> The resin composition of any one of <1> to <5>, demonstrating a deflection temperature under load, measured in compliance with JIS 7191, of 100° C. or higher.

<7> The resin composition of any one of <1> to <6>, demonstrating a color difference ΔE in the SCI mode, when formed into 1.5 mm thick and measured before and after 500-hour treatment in compliance with ASTM 155-1, of smaller than 5.

<8> The resin composition of any one of <1> to <7>, wherein the inorganic filler contains a glass fiber.

<9> The resin composition of any one of <1> to <8>, wherein the dye is a transmissive coloring matter.

<10> The resin composition of <9>, demonstrating a transmittance at 1064 nm wavelength, when formed into 1.5 mm thick, of 206% or larger.

<11> The resin composition of <9> or <10>, being a resin composition for Galvano-scanning laser welding.

<12> A kit comprising the resin composition described in any one of <9> to <11>, and an absorptive resin composition that contains a thermoplastic resin and an absorptive coloring matter.

<13> A formed article formed of the resin composition described in any one of <1> to <11>.

<14> A UV exposed article formed of the resin composition described in any one of <9> to <11>, or formed of a kit described in <12>.

<15> A UV exposed article of <14>, being a car-borne camera component, an case of an in-vehicle and/or outside-vehicle millimeter-wave radar, an case of electric parking brake, or an case of sensor casing.

<16> A car-borne camera component formed of the resin composition described in any one of <9> to <11>, or formed of a kit described in <12>.

<17> A car-borne camera module comprising the car-borne camera component described in <16>.

<18> A method for manufacturing a formed article, the method comprising laser-welding a formed article formed of the resin composition described in any one of claims <9> to <11>, and a formed article formed of an absorptive resin composition that contains a thermoplastic resin and an absorptive coloring matter.

<19> The method for manufacturing a formed article of <18>, wherein the laser welding is Galvano-scanning laser welding.

Advantageous Effects of Invention

This invention is the first to provide a resin composition that is suppressed from color fading after weathering test and excels in heat resistance, as well as to provide a formed article with use of such resin composition, a kit, a car-borne camera component, a car-borne camera module, and a method for manufacturing a formed article.

DESCRIPTION OF EMBODIMENTS

Figure 1:
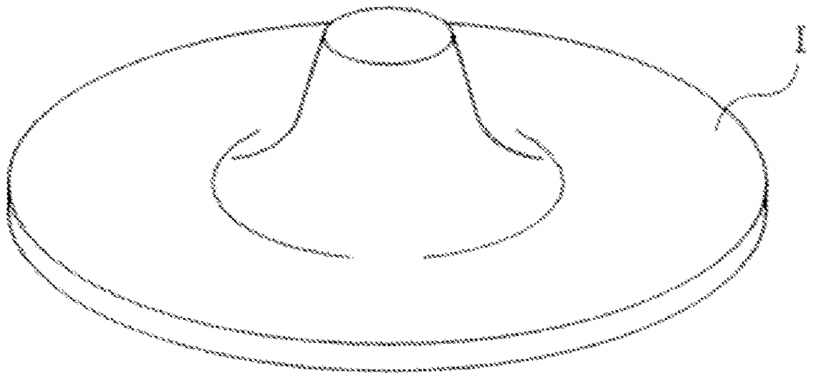
FIG. 1 A schematic drawing illustrating a test specimen used for measuring laser weld strength in Example.
Figure 1:
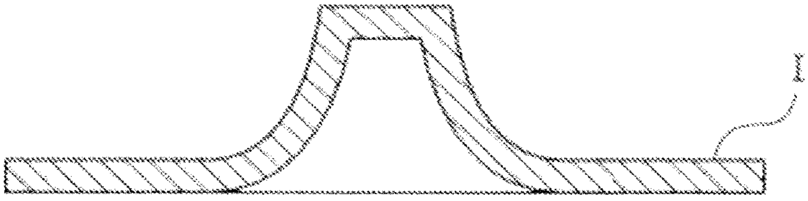

Embodiments for carrying out the invention (simply referred to as "this embodiment", hereinafter) will be detailed below. The embodiments below are merely illustrative, so that this invention is not limited solely to these embodiments.

Note that all numerical ranges given in this patent specification, with "to" preceded and succeeded by numerals, are used to represent the ranges including these numerals respectively as the Tower and upper limit values.

Various physical properties and characteristic values mentioned herein are those demonstrated at 23° C., unless otherwise specifically noted.

Note that "parts by mass" in this patent specification denotes relative amount of component, and "% by mass" denotes absolute amount of component.

A resin composition of this embodiment includes, per 100 parts by mass of a resin component that contains 50 to 95% by mass of a polybutylene terephthalate resin (A), and 5 to 50% by mass of a thermoplastic resin (B) that demonstrates a glass transition temperature, measured with use of a differential scanning calorimeter, higher by 15 to 150° C. than that of the polybutylene terephthalate resin (A); 0.001 to 5 parts by mass of a dye; and 5 to 100 parts by mass of an inorganic filler.

With such structure, obtainable is a formed article that excels in heat resistance, and is suppressed from color fading even after weathering test. This also yields a formed article that excels in mechanical strength. This also yields the formed article that excels in weld strength. Again, this also yields the formed article that excels in transmittance.

<Polybutylene Terephthalate Resin (A)>

The resin composition of this embodiment contains, in the resin component, 50 to 95% by mass of a polybutylene terephthalate resin (A).

The polybutylene terephthalate resin is obtainable by polycondensation between terephthalic acid as a major component of the acid component, and 1,4-butanediol as a major component of the diol component. "Terephthalic acid as a major component of the acid component" means that 50% by mass or more of the acid component is attributable to terephthalic acid, wherein the percentage is more preferably 60% by mass or more, more preferably 70% by mass or more, even more preferably 80% by mass or more, and may be 90% by mass or more, and may even be 95% by mass or more. Meanwhile, "1,4-butane diol as a major component of the diol component" means that 50% by mass or more of the diol component is attributable to 1,4-butane diol, wherein the percentage is more preferably 60% by mass or more, even more preferably 70% by mass or more, yet more preferably 80% by mass or more, and may be 90% by mass or more, and may even be 95% by mass or more.

Other acid component, when contained in the polybutylene terephthalate resin, is exemplified by isophthalic acid and dimer acid. Meanwhile, other diol component, when contained in the polybutylene terephthalate resin, is exemplified by polyalkylene glycol such as polytetramethylene glycol (PTMG).

In a case where a product copolymerized with polytetramethylene glycol is used as the polybutylene terephthalate resin (A), the proportion of the tetramethylene glycol component in the copolymer is preferably 3 to 40% by mass, more preferably 5 to 30% by mass, and even more preferably 10 to 25% by mass. With such proportion of copolymerization, the laser weldability and the heat resistance will tend to be balanced more suitably and desirably.

In a case where the polybutylene terephthalate copolymerized with dimer acid is used as the polybutylene terephthalate resin (A), proportion of the dimer acid component relative to all carboxylic acid components is preferably 0.5 to 30 mold in terms of carboxylic acid group, more preferably 1 to 20 mol %, and even more preferably 3 to 15 mol %. With such proportion of copolymerization, balance among the laser weldability, long-term heat resistance and toughness will tend to improve desirably.

In a case where polybutylene terephthalate copolymerized with isophthalic acid is used as the polybutylene terephthalate resin (A), proportion of isophthalic acid component relative to all carboxylic acid components is preferably 1 to 30 mol % in terms of carboxylic acid group, more preferably 1 to 20 mol %, and even more preferably 3 to 15 mol %. With such proportion of copolymerization, balance among the laser weldability, heat resistance, injection moldability, and toughness will tend to improve desirably.

The polybutylene terephthalate resin (A) used in this embodiment is preferably a resin (polybutylene terephthalate homopolymer), in which 90% by mass or more of the acid component is attributable to terephthalic acid, and 90% by mass or more of the diol component is attributable to 1,4-butanediol; polybutylene terephthalate resin copolymerized with polytetramethylene glycol; or polybutylene terephthalate resin copolymerized with isophthalic acid.

The polybutylene terephthalate resin (A) is preferably any of those having an intrinsic viscosity of 0.5 to 2 dL/g. Any of those having an intrinsic viscosity within the range from 0.6 to 1.5 dL/g is more preferred, form the viewpoint of formability and mechanical characteristics.

With use of the resin having an intrinsic viscosity of 0.5 dL/g or larger, the obtainable formed article will tend to further improve the mechanical strength. Meanwhile, with use of any of those having an intrinsic viscosity of 2 dL/g or smaller, the polybutylene terephthalate resin will tend to have improved fluidity, improved formability, and further improved laser weldability.

Note now, the intrinsic viscosity is measured in a 1:1 (mass ratio) mixed solvent of tetrachloroethane and phenol, at 30° C.

In a case where two or more kinds of polybutylene terephthalate resin are contained, the intrinsic viscosity is given by intrinsic viscosity of the mixture.

Terminal carboxy group content of the polybutylene terephthalate resin (A) may be properly selected and determined, which is usually 60 eq/ton or less, preferably 50 eq/ton or less, and even more preferably 30 eq/ton or less. With the terminal carboxy group content adjusted to 50 eq/ton or less, the polybutylene terephthalate will be more effectively suppressed from causing degassing during melt forming. The lower limit value of the terminal carboxy group content, although not specifically limited, is usually 5 eq/ton or below.

When two or more kinds of the polybutylene terephthalate resin are contained, the terminal carboxy group content is defined by the terminal carboxy group content of the mixture.

The terminal carboxy group content of the polybutylene terephthalate resin (A) is determined by dissolving 0.5 g of polybutylene terephthalate resin (A) into 25 mL of benzyl alcohol, and titrating the solution with a 0.01 mol/L sodium hydroxide solution in benzyl alcohol. Method for adjusting the terminal carboxy group content may be any of known methods, which are exemplified by a method for adjusting material loading ratio for polymerization, method for controlling polymerization conditions including polymerization temperature and decompression method, and method for reacting a terminal blocker.

The polybutylene terephthalate resin (A) preferably demonstrates a glass transition temperature, measured with use of a differential scanning calorimeter, of 32° C. or higher, which is more preferably 34° C. or higher, even more preferably 36° C. or higher, yet more preferably 38° C. or higher, and furthermore preferably 40° C. or higher. At or above the lower limit value, the formed article will be less likely to deform under an environment of use (at normal temperature, for example), or will tend to be more heat resistant.

Meanwhile, the polybutylene terephthalate resin (A) preferably demonstrates a glass transition temperature, measured with use of a differential scanning calorimeter, of 70° C. or lower, which is more preferably 68° C. or lower, even more preferably 66° C. or lower, yet more preferably 64° C. or lower, and furthermore preferably 62° C. or lower. At or below the upper limit value, the formability will tend to improve.

The glass transition temperature of the polybutylene terephthalate resin (A) is measured according to the description later in EXAMPLES.

When two or more kinds of the polybutylene terephthalate resin (A) are contained, the glass transition temperature is defined by the glass transition temperature of the mixture.

<Thermoplastic Resin (B)>

The resin composition of this embodiment contains, in the resin component thereof, 5 to 50% by mass of a thermoplastic resin (B) that demonstrates a glass transition temperature, measured with use of a differential scanning calorimeter, higher by 15 to 150° C. than that of the polybutylene terephthalate resin (A). With such thermoplastic resin blended therein, the resin composition will be less likely to cause color fading of the dye even after weathering test. Moreover, the resin composition, when formed into a formed article or a transmissive resin member, will excel in weld strength with an absorptive resin member.

The glass transition temperature of the thermoplastic resin (B) used in this embodiment is preferably 20° C. or higher than the glass transition temperature of the polybutylene terephthalate resin (A), which is more preferably 25° C. or higher, even more preferably 30° C. or higher, yet more preferably 50° C. or higher, and furthermore preferably 60° C. or higher. At or above the lower limit value, the formed article will be further less likely to fade during the weathering test, or after left outdoors for a long term.

Difference of the glass transition temperature, from the glass transition temperature of the polybutylene terephthalate resin (A) (polybutylene terephthalate resin (A)—thermoplastic resin (B)), is preferably 145° C. or smaller, more preferably 135° C. or smaller, and even more preferably 130° C. or smaller. At or below the upper limit value, the resin composition will tend to improve the extrudability and formability.

The thermoplastic resin (B) preferably demonstrates a glass transition temperature, measured with use of a differential scanning calorimeter, of 60° C. or higher, which is more preferably 70° C. or higher, even more preferably 80° C. or higher, yet more preferably 95° C. or higher, and furthermore preferably 110° C. or higher. At or above the lower limit value, the formed article will be further less likely to fade during the weathering test, or after left outdoors for a long term.

Meanwhile, the thermoplastic resin (B) preferably demonstrates a glass transition temperature, measured with use of a differential scanning calorimeter, of 200° C. or lower, which is more preferably 190° C. or lower, even more preferably 180° C. or lower, yet more preferably 170° C. or lower, and furthermore preferably 160° C. or lower. At or below the upper limit value, the formability will tend to further improve.

The glass transition temperature of the thermoplastic resin (B) will be measured according to the description later in EXAMPLES.

When two or more kinds of the thermoplastic resin (B) are contained, it suffices that the glass transition temperature of each thermoplastic resin (B) falls within the range of this invention.

The thermoplastic resin (B) is exemplified by polycarbonate resin, aromatic vinyl resin, polyester resin other than the polybutylene terephthalate resin (A), acrylic resin, polyacetal resin, polyphenylene oxide resin, polyphenylene sulfide resin, polysulfone resin, polyethersulfone resin, polyetherimide resin, polyetherketone resin, and polyolefin resin. Among them, polycarbonate resin, aromatic vinyl resin, polyester resin other than the polybutylene terephthalate resin (A) and acrylic resin are preferred; and polycarbonate resin, aromatic vinyl resin, and polyester resin other than the polybutylene terephthalate resin (A) are more preferred. Polycarbonate resin is preferred for more effective demonstration of laser weldability.

The polycarbonate resin used in this embodiment may be any of known polycarbonate resins. The polycarbonate resin is an optionally branched thermoplastic polymer or copolymer, usually obtainable by reacting dihydroxy compound, occasionally together with a small amount of polyhydroxy compound, with phosgene or carbonic acid diester. Method for producing the polycarbonate resin is not specifically limited, and any of those produced by known methods including phosgene method (interfacial polymerization) or melt polymerization (transesterification) may be used. The polycarbonate resin produced by the melt polymerization is preferred, from the viewpoint of laser transmittance and laser weldability.

The dihydroxy compound used as the raw material is preferably an aromatic dihydroxy compound, which is exemplified by 2,2-bis(4-hydroxyphenyl)propane (or, bisphenol A), tetramethylbisphenol A, bis(4-hydroxyphenyl)-p-diisopropyl benzene, hydroquinone, resorcinol, and 4,4-dihydroxybiphenyl. Bisphenol A is preferred. Also the aromatic dihydroxy compound, having one or more tetraalkylphosphonium sulfonates bound thereto, may be used.

Among the aforementioned polycarbonate resins, preferred is aromatic polycarbonate resin derived from 2,2-bis(4-hydroxyphenyl)propane, or, aromatic polycarbonate copolymer derived from 2,2-bis(4-hydroxyphenyl)propane and other aromatic dihydroxy compound. The polycarbonate resin may alternatively be a copolymer copolymerized with a polymer or oligomer having a siloxane structure. Still alternatively, two or more kinds of the aforementioned polycarbonate resins may be mixed for use.

The polycarbonate resin preferably has a viscosity-average molecular weight of 5000 to 30000, which is more preferably 10000 to 28000, and even more preferably 14000 to 24000. With use of the polycarbonate resin having a viscosity-average molecular weight of 5000 or larger, the obtainable formed article will tend to improve the mechanical strength. Meanwhile, with use of the polycarbonate resin having a viscosity-average molecular weight of 30000 or smaller, the resin composition will have improved fluidity, and tend to further improve the formability or laser weldability.

Note that the viscosity-average molecular weight [Mv] of the polycarbonate resin is determined by converting solution viscosity measured at 25° C. in methylene chloride used as a solvent.

The polycarbonate resin preferably demonstrates a ratio (Mw/Mn) of mass average molecular weight Mw and number average molecular weight Mn, which are polystyrene equivalent values measured by gel permeation chromatography (GPC), of 2 to 5, wherein the ratio is more preferably 2.5 to 4. Too small Mw/Mn will tend to increase the fluidity in molten state, thus degrading the formability. Meanwhile, too large Mw/Mn will tend to increase the melt viscosity, thus making the forming difficult.

The polycarbonate resin preferably has a terminal hydroxy group content of 100 ppm by mass or more, from the viewpoints of heat stability, hydrolytic stability, color tone and so forth, which is more preferably 200 ppm by mass or more, even more preferably 400 ppm by mass or more, and yet more preferably 500 ppm by mass or more. Meanwhile, the polycarbonate resin has a terminal hydroxy group content of 1500 ppm by mass or less, which is preferably 1300 ppm by mass or less, even more preferably 1200 ppm by mass or less, and yet more preferably 1000 ppm by mass or less. With the terminal hydroxy group content of the polycarbonate resin controlled at or above the lower limit value, the laser transmissivity tends to further improve, and the initial hue in forming tends to improve. With the terminal hydroxy group content controlled at or below the lower limit value, the residence heat stability and the moist heat resistance tend to further improve.

The polyester resin other than the thermoplastic resin (IQ is preferably a polyethylene terephthalate resin, although the type thereof is not specifically limited.

The polyethylene terephthalate resin is obtainable by polycondensing terephthalic acid as a major component of the acid component, with ethylene glycol as a major component of the diol component. "Terephthalic acid as a major component of the acid component" means that 50% by mass or more of the acid component is attributable to terephthalic acid, wherein the percentage is more preferably 60% by mass or larger, more preferably 70% by mass or larger, even more preferably 80% by mass or larger, and may be 90% by mass or larger, and may even be 95% by mass or larger. Meanwhile, "ethylene glycol as a major component of the diol component" means that 50% by mass or more of the diol component is attributable to ethylene glycol, wherein the percentage is more preferably 60% by mass or larger, even more preferably 70% by mass or larger, may be 80% by mass or larger, again may be 90% by mass or larger, and may even be 95% by mass or larger.

Other acid component, when contained in the polyethylene terephthalate resin, is exemplified by phthalic acid, isophthalic acid, naphthalenedicarboxylic acid, 4,4'-diphenylsulfonedicarboxylic acid, 4,4'-biphenyldicarboxylic acid, 1,4-cyclohexanedicarboxylic acid, 1,3-phenylenedioxy diacetic acid and structural isomers of these compounds; dicarboxylic acids such as malonic acid, succinic acid, and adipic acid, and derivatives of these compounds; and oxy acids such as p-hydroxybenzoic acid and glycolic acid, and derivatives of these compounds.

In a case where the polyethylene terephthalate resin contains other acid component, such other diol component is exemplified by aliphatic glycol such as 1,2-propanediol, 1,3-propanediol, 1,4-butanediol, pentamethylene glycol, hexamethylene glycol, and neopentyl glycol; alicyclic glycol such as cyclohexanedimethanol; and aromatic dihydroxy compound derivatives such as bisphenol A and bisphenol S.

The polyethylene terephthalate resin may further be copolymerized with a branching component that is exemplified by trifunctional ester-forming acid such as tricarballylic acid, trimeric acid, and trimellitic acid; tetrafunctional ester-forming acid such as pyromellitic acid; trifunctional or tetrafunctional ester-forming alcohol such as glycerin, trimethylolpropane and pentaerythritol, whose amount is 1.0 mol % or less, more preferably 0.5 mol % or less, and even more preferably 0.3 mol % or less.

The polyethylene terephthalate resin preferably has a limiting viscosity of 0.3 to 1.5 dL/g, which is more preferably 0.3 to 1.2 dL/g, and even more preferably 0.4 to 0.8 dL/g.

Note that intrinsic viscosity of the polyethylene terephthalate resin is measured at 30° C., in a 1:1 (ratio by mass) mixed solvent of tetrachloroethane and phenol.

The polyethylene terephthalate resin preferably has a terminal carboxy group concentration of 3 to 60 eq/ton, which is more preferably 5 to 50 eq/ton, and even more preferably 8 to 40 eq/ton. With the terminal carboxy group concentration adjusted to 60 eq/ton or below, the resin will be less likely to cause degassing during melt forming of the resin material, and the obtainable formed article will have improved mechanical strength, meanwhile with the terminal carboxy group concentration adjusted to 3 eq/ton or above, the obtainable formed article will tend to have improved heat resistance, residence heat stability and hue, which is desirable.

The terminal carboxy group concentration of the polyethylene terephthalate resin is determined by dissolving 0.5 g of polyethylene terephthalate resin into 25 mL of benzyl alcohol, and titrating the solution with a 0.01 mol/L sodium hydroxide solution in benzyl alcohol.

The aromatic vinyl resin used in this embodiment is a polymer having an aromatic vinyl compound as a major component. "Having an aromatic vinyl compound as a major component" means that 50% by mass or more of the raw material monomer is attributable to aromatic vinyl compound, wherein the percentage is preferably 60% by mass or larger, more preferably 70% by mass or larger, may be 80% by mass or larger, again may be 90% by mass or larger, and may even be 95% by mass or larger.

The aromatic vinyl compound is exemplified by styrene, α-methylstyrene, paramethylstyrene, vinyltoluene, and vinylxylene, wherein styrene is preferred. Polystyrene (PS) is a representative aromatic vinyl resin.

Also copolymer obtainable by copolymerizing the aromatic vinyl compound copolymerized with other monomer is usable as the aromatic vinyl resin. Representative examples include acrylonitrile-styrene copolymer (AS resin) obtainable by copolymerizing styrene with acrylonitrile, and maleic anhydride-styrene copolymer (maleic anhydride-modified polystyrene resin) obtainable by copolymerizing styrene with maleic anhydride.

Also a rubber-containing aromatic vinyl resin, having a rubber component copolymerized therewith or blended therein, may be preferably used as the aromatic vinyl resin. The rubber component is exemplified by conjugated diene-based hydrocarbon such as butadiene, isoprene, and 1,3-pentadiene. Butadiene-based rubber is preferably used in this embodiment.

The amount of the rubber component, when copolymerized or blended, is usually 1% by mass or more and less than 50% by mass of all segments of the aromatic vinyl resin, preferably 3 to 40% by mass, more preferably 5 to 30% by mass, and even more preferably 5 to 20% by mass.

The rubber component-containing aromatic vinyl resin is preferably rubber-containing polystyrene, more preferably butadiene rubber-containing polystyrene, and particularly preferably high-impact polystyrene (HIPS) from the viewpoint of toughness.

The aromatic vinyl resin is preferably polystyrene, acrylonitrile-styrene copolymer (AS resin), butadiene rubber-containing polystyrene or maleic anhydride-modified polystyrene. Among them, polystyrene and high-impact polystyrene (HIPS) are preferred.

The aromatic vinyl resin preferably has a mass-average molecular weight, measured by GPC, of 50000 to 500000, more preferably 100000 to 400000, and particularly preferably 150000 to 300000. With the mass-average molecular weight adjusted to 50000 or larger, the formed article will be effectively suppressed from causing bleed-out, will be less likely to emit decomposition gas, and will tend to improve the weld strength. Meanwhile, with the mass-average molecular weight adjusted to 500000 or smaller, the resin composition will have improved fluidity, and will tend to have improved laser-weld strength.

The aromatic vinyl resin, when assumed to be an acrylonitrile-styrene copolymer, preferably has a melt flow rate (MFR) of 0.1 to 50 g/10 min, when measured at 220° C. under 98 N load, which is more preferably 0.5 to 30 g/10 min, and even more preferably 1 to 20 g/10 min. With the MFR adjusted to 0.1 g/10 min or larger, compatibility with the polybutylene terephthalate resin (A1) may improve, and poor appearance due to delamination during injection molding may be suppressed more effectively. Meanwhile, with MFR adjusted to 50 g/10 min or smaller, the impact resistance tends to improve. MFR is measured in compliance with JIS K7210.

Meanwhile, the aromatic vinyl resin, when assumed to be polystyrene, preferably has a melt flow rate (MFR) of 1 to 50 g/10 min, when measured at 200° C. under 48 N load, which is more preferably 3 to 35 g/10 min, and even more preferably 5 to 20 g/10 min.

The aromatic vinyl resin, when assumed to be butadiene rubber-containing polystyrene, preferably has a melt flow rate (MFR) of 0.1 to 40 g/10 min, when measured at 200° C. under 49 N load, which is more preferably 0.5 to 30 g/10 min, and even more preferably 0.8 to 20 g/10 min.

<Blend Ratio and Content of Resin Component>

In this embodiment, the resin component contains 50 to 95% by mass of the polybutylene terephthalate resin (A), and 5 to 50% by mass of a thermoplastic resin (B) that demonstrates a glass transition temperature, measured with use of a differential scanning calorimeter, higher by 15 to 150° C. than that of the polybutylene terephthalate resin (A).

The content of the polybutylene terephthalate resin (A), in the resin component, is preferably 54% by mass or more, more preferably 55% by mass or more, may be 57% by mass or more, and may even be 60% by mass or more. Meanwhile, the content of the polybutylene terephthalate resin (A), in the resin component, is preferably 93% by mass or less, may be 85% by mass or less, again may be 75% by mass or less, and may even be 73% by mass or less.

The resin component may contain only one kind, or two or more kinds of the polybutylene terephthalate resin (A). When two or more kinds are contained, the total content preferably falls within the aforementioned ranges.

The content of the thermoplastic resin (B), in the resin component, is preferably 7% by mass or more, may be 15% by mass or more, again may be 25% by mass or more, and may even be 27% by mass or more. Meanwhile, the content of the thermoplastic resin (B), in the resin component, is preferably 46% by mass or less, more preferably 45% by mass or less, may be 43% by mass or less, and may even be 40% by mass or less.

The resin component may contain only one kind, or two or more kinds of the thermoplastic resin (B). When two or more kinds are contained, the total content preferably falls within the aforementioned ranges.

The resin composition of this embodiment may further contain, as a resin component, a thermoplastic resin (C) other than the polybutylene terephthalate resin (A), and other than the thermoplastic resin (B) that demonstrates a glass transition temperature, measured with use of a differential scanning calorimeter, higher by 15 to 150° C. than that of the polybutylene terephthalate resin (A).

Such other thermoplastic resin (C) means a resin whose glass transition temperature, measured with use of a differential scanning calorimeter, is less than 15° C., or more than 150° C. different from the glass transition temperature of the polybutylene terephthalate resin (A) (Tg of thermoplastic resin (C)—Tg of polybutylene terephthalate resin (A)). Specific examples include polyethylene resin, polypropylene resin, and polyamide resin.

In the resin composition of this embodiment, total content of the polybutylene terephthalate resin (A), and the thermoplastic resin (B) that demonstrates a glass transition temperature, measured with use of a differential scanning calorimeter, higher by 15 to 150° C. than that of the polybutylene terephthalate resin (A), preferably accounts for 80% by mass or more of the resin component, the percentage is more preferably 85% by mass or larger, even more preferably 90% by mass or larger, yet more preferably 95% by mass or larger, and furthermore preferably 98% by mass or larger.

The content of the resin component in the resin composition of this embodiment is preferably 60% by mass or more of the resin composition, and is more preferably 65% by mass or more. Meanwhile, the content of the resin component is preferably 80% by mass or less, and more preferably 75% by mass or less.

<Dye>

The resin composition of this embodiment contains 0.001 to 5 parts by mass of a dye, per 100 parts by mass of the resin component.

The dye is suitably selectable depending on applications, without limitation on color. The dye used in this embodiment is preferably black dye and/or black dye composition. The black dye composition means a dye composition that looks black, as a result of combination of two or more kinds of chromatic coloring matter of red, blue, green and so forth.

A first embodiment of the black dye composition relates to a mode that contains a green dye and a red dye. A second embodiment of the black dye composition relates to a mode that contains a red dye and a blue dye and a yellow dye.

In a case where the resin composition of this embodiment is used as the light-transmissive resin composition for laser welding, the dye is a light-transmissive coloring matter. The light-transmissive coloring matter is defined by a coloring matter that makes a blend demonstrate a light transmittance of 20% or larger, when measured by the measurement method described later in EXAMPLES, typically when 0.2% by mass of such coloring matter (coloring matter presumed to be a light-transmissive coloring matter) is blended with a polybutylene terephthalate resin (for example, Novaduran (registered trademark) 5008), 30% by mass of glass fiber (for example, T-127 (trade name), from Nippon Electric Glass Co., Ltd.), totaling 100% by mass. The light-transmissive coloring matter is specifically exemplified by naphthalocyanine, aniline black, phthalocyanine, porphyrin, perinone, quaterrylene, azo, azomethine, anthraquinone, pyrazolone, squaric acid derivative, perylene, chromium complex, and immonium. Among them, azomethine, anthraquinone, and perinone are preferred, and anthraquinone and perinone are further preferred.

With the light-transmissive coloring matter blended in this embodiment, the resin composition of this embodiment, when formed into 1.5 mm thick, can demonstrate a transmittance at 1064 nm wavelength of 20% or larger. The upper limit, although ideally 100%, may be 90% or smaller.

Commercially available coloring matter is exemplified by Plast Yellow 8000, Plast Red M 8315, Plast Red 8370, and Oil Green 5602 from Arimoto Chemical Co., Ltd.; Macrolex Yellow 3G, Macrolex Red EG, and Macrolex Green 5B from LANXESS AG; and KP Plast HK, KP Plast Red HG, KP Plast Red H2G, KP Plast Blue R, KP Plast Blue GR, and KP Plast Green G from KIWA Chemical Industry Co., Ltd.

Also the coloring matter described in JP 4157300 B, and the coloring matter described in JP 4040460 B are applicable, the contents of which are incorporated herein by reference.

The resin composition of this embodiment contains 0.001 to 5 parts by mass of the dye, per 100 parts by mass of the resin component. The lower limit value of the content is preferably 0.01 parts by mass or above, more preferably 0.05 parts by mass or above, even more preferably 0.1 parts by mass or above, and yet more preferably 0.2 parts by mass or above. At or above the lower limit value, the formed article may be colored, and may improve appearance of the laser-welded article. Also the weatherability tends to improve. The upper limit value of the content is preferably 3 parts by mass or below, more preferably 2 parts by mass or below, even more preferably 1 part by mass or below, yet more preferably 0.8 parts by mass or below, and furthermore preferably 0.5 parts by mass or below. At or below the upper limit value, the dye may be effectively suppressed from bleeding out.

The resin composition of this embodiment may contain only one kind of, or two or more kinds of the dye. When two or more kinds are contained, the total content preferably falls within the aforementioned ranges.

Nigrosin is preferably not contained from the viewpoint of weatherability, whose content being preferably 5 ppm or less on the mass basis per 100 parts by mass of the resin component, which is more preferably 3 ppm or less.

<Inorganic Filler>

The resin composition of this embodiment contains 5 to 100 parts by mass of the inorganic filler, per 100 parts by mass of the resin component. With the inorganic filler, particular with a fibrous inorganic filler, and preferably with a glass fiber contained therein, the resin composition will have elevated heat resistance temperature. More specifically, the deflection temperature under load will rise up, and the formed article will be more effectively suppressed from thermally deforming even after use in a high temperature environment.

The inorganic filler suitably contained in the resin composition of this embodiment is a substance which can demonstrate, when blended with a resin, an effect of enhancing mechanical properties of the obtainable resin composition, to which any of common inorganic fillers for plastics is applicable. Fibrous inorganic filler such as glass fiber, carbon fiber, basalt fiber, wollastonite, or potassium titanate fiber is preferably used. Also granular or shapeless filler such as calcium carbonate, titanium oxide, feldspar-based mineral, clay, organized clay, and glass bead; plate like filler such as talc; flaky inorganic filler such as glass flake, mica, and graphite may be used. Among them, fibrous filler, and particularly glass fiber is preferred, from the viewpoint of laser transmittance, mechanical strength, rigidity and heat resistance. The glass fiber used herein may have either circular cross section or modified cross section.

The inorganic filler used herein is more preferably surface-treated with a surface treatment agent such as coupling agent. The glass fiber having the surface treatment agent adhered thereon is preferred for its excellent durability, moist heat resistance, hydrolysis resistance, and heat shock resistance.

The surface treatment agent used herein may be any of known agents, wherein preferred agents are specifically exemplified by silane coupling agent of aminosilane-base, epoxy silane-base, allylsilane-base, and vinyl silane-base. Among them, preferred is the aminosilane-based surface treatment agent, which is specifically exemplified by γ-aminopropyl triethoxysilane, γ-aminopropyl trimethoxysilane and γ-(2-aminoethyl)aminopropyl trimethoxysilane.

Also other preferred surface treatment agent is exemplified by novolac-type epoxy resin-based surface treatment agent, and bisphenol A-type epoxy resin-based surface treatment agent. In particular, treatment with the novolac-type epoxy resin-based surface treatment agent is preferred.

Each of the silane-based surface treatment agent and the epoxy resin-based surface treatment agent may be used singly, in combination of two or more kinds thereof, or both of them may be preferably used in combination. The glass fiber in this embodiment means a fibrous glass material, and more specifically has a chopped foam obtained by sizing 1,000 to 10,000 glass fibers to form a strand, and then by cutting the strand into a predetermined length.

The glass fiber in this embodiment preferably has a number-average fiber length of 0.5 to 10 mm, which is more preferably 1 to 5 mm. With use of the glass fiber having the number-average fiber length thus adjusted, the mechanical strength may further be enhanced. The number-average fiber length is determined on an image observed under an optical microscope, by randomly extracting the glass fibers whose fiber length will be determined, then measuring the length of the long sides, and by averaging the measured values. The observation is made at 20× magnification, targeted at 1000 or more fibers. The number average fiber length is approximately equivalent to the cut length.

The reinforcing fiber may have any cross-sectional shape selected from circle, oval, oblong circle, rectangle, rectangle combined with semicircles on both short sides, cocoon and so forth. Circle is preferred. The circle herein not only means geometrical circle, but also conceptually include any shape usually understood to be circle in the technical field to which this embodiment belongs.

The lower limit of the number average fiber diameter of the glass fiber is preferably 4.0 μm or above, more preferably 4.5 μm or above, and even more preferably 5.0 μm or above. The upper limit of the number average fiber diameter of the glass fiber is preferably 15.0 μm or below, and more preferably 14.0 μm or below. With use of the glass fiber having the number average fiber diameter controlled within these ranges, the obtainable formed article will tend to further excel in the mechanical strength. Note that the number average fiber diameter of the glass fiber can be determined on an image observed under an electron microscope, by randomly selecting the glass fibers whose diameter will be determined, then by measuring the diameter at the near center of the fiber, and by averaging the measured values. The observation is made at 1,000× magnification, targeted at 1,000 or more fibers. The number average fiber diameter of glass fiber having a cross-sectional shape other than circle is determined after converting the cross section into a circle having the same area.

The glass fiber used herein may be any fiber melt-spun from commonly marketed glasses such as E-glass (electrical glass), C-glass (chemical glass), A-glass (alkali glass), S-glass (high strength glass), D-glass, and alkali resistant glass, which are not specifically limited so long as they can be spun into glass fiber. In this embodiment, E-glass is preferably contained.

The glass fiber used in this embodiment is preferably surface-treated with a surface treatment agent which is typically a silane coupling agent such as γ-metacryloxypropyl trimethoxysilane, γ-glycidoxypropyl trimethoxysilane, or γ-aminopropyl triethoxysilane. Amount of adhesion of the surface treatment agent is preferably 0.01 to 1% by mass of the glass fiber. Other glass fibers usable here include those optionally surface-treated with lubricant such as aliphatic amide compound or silicone oil, antistatic agent such as quaternary ammonium salt, film-forming resin such as epoxy resin or urethane resin, and mixture of film-forming resin with heat stabilizer, flame retardant and so forth.

The glass fiber is commercially available, and exemplified by T-286H, T-756H, T-127 and T-289H from Nippon Electric Glass Co., Ltd.; DEFT2A from Owens Corning; HP3540 from PPG Industries, Inc.; and CSG3PA820 from Nitto Boseki Co., Ltd.

As described previously, the resin composition of this embodiment contains 5 to 100 parts by mass of the inorganic filler (preferably glass fiber), per 100 parts by mass of the resin component. The lower limit value of the content of the inorganic filler, per 100 parts by mass of the resin component, is preferably 10 parts by mass or above, more preferably 15 parts by mass or above, even more preferably 25 parts by mass or above, yet more preferably 30 parts by mass or above, and furthermore preferably 35 parts by mass or above. At or above the lower limit value, the mechanical strength tends to improve, the heat resistance tends to further improve, and the heat deformation temperature tends to further rise up. The upper limit value of the content of the inorganic filler, per 100 parts by mass of the resin component, is preferably 90 parts by mass or below, more preferably 80 parts by mass or below, even more preferably 70 parts by mass or below, yet more preferably 60 parts by mass or below, and furthermore preferably 50 parts by mass or below. At or below the upper limit value, the extrudability and formability tend to further improve.

Content of the inorganic filler (preferably glass fiber) in the resin composition of this embodiment is preferably 10% by mass or more of the resin composition, which is more preferably 20% by mass or more, and may even be 25% by mass or more. Meanwhile, the content of the inorganic filler (preferably glass fiber) is preferably 50% by mass or less, more preferably 40% by mass or less, and may even be 35% by mass or less.

The resin composition of this embodiment may contain only one kind of, or two or more kinds of the inorganic filler (preferably glass fiber). When two or more kinds are contained, the total content preferably falls within the aforementioned ranges.

<Reactive Compound>

The resin composition of this embodiment preferably contains an additional reactive compound. The reactive compound is preferably a compound capable of chemically reacting with a carboxy group or a hydroxy group that resides at the terminal of the polybutylene terephthalate resin, to cause crosslinking reaction or chain elongation. The reactive compound preferably contains one or more compound selected from the group consisting of epoxy compound, carbodiimide compound, compound having oxazoline group (ring), compound having oxazine group (ring), compound having carboxy group, and compound having amido group; more preferably contains at least one compound selected from epoxy compound or carbodiimide compound; and even more preferably contains epoxy compound.

«Epoxy Compound»

The epoxy compound has one or more epoxy groups in a molecule, and is exemplified by glycidyl compound, epoxy compound having aromatic ring, and alicyclic epoxy compound. At least the epoxy compound having aromatic ring is preferably contained.

The epoxy compound is specifically exemplified by aromatic ring-containing epoxy compounds such as bisphenol A-type epoxy compound (including bisphenol A diglycidyl ether), bisphenol F-type epoxy compound (including bisphenol F diglycidyl ether), biphenyl-type epoxy compound (including bis(glycidyloxy)biphenyl), resorcine-type epoxy compound (including resorcinol diglycidyl ether), novolac-type epoxy compound, glycidyl benzoate, diglycidyl terephthalate, and diglycidyl orthophthalate; (di)glycidyl ethers such as methylglycidyl ether, butyl glycidyl ether, 2-ethylhexyl glycidyl ether, decyl glycidyl ether, stearyl glycidyl ether, phenyl glycidyl ether, butylphenyl glycidyl ether, allyl glycidyl ether, neopentyl glycol diglycidyl ether, ethylene glycol diglycidyl ether, glycerin diglycidyl ether, and propylene glycol diglycidyl ether; paraffinic (e.g., saturated fatty acid-based) or olefinic (e.g., unsaturated fatty acid-based) (di)glycidyl esters such as glycidyl sorbate, diglycidyl adipate, epoxylated linseed oil, and epoxylated soybean oil; alicyclic epoxy compounds such as vinyl cyclohexene dioxide, and dicyclopentadiene; and epoxy-modified styrene-acrylic copolymer.

Among them, more preferred are the styrene-acrylic copolymer having glycidyl group in the side chain, bisphenol A-type epoxy compound, novolac-type epoxy compound, bisphenol F-type epoxy compound, and biphenyl-type epoxy compound; and particularly preferred is orthocresol/novolac-type epoxy resin (polyglycidyl ether compound of o-cresol/formaldehyde polycondensate).

Commercially available products include Joncryl ADR4368C (trade name: from BASF SE), Epikote 1003 (trade name: from Mitsubishi Chemical Corporation), and YDCN704 (trade name: from Nippon Steel & Sumikin Materials. Co., Ltd.).

The epoxy compound preferably has a mass-average molecular weight of 15000 or smaller, which is more preferably 10000 or smaller. The lower limit value of the mass-average molecular weight, although not specifically limited, is preferably 100 or above, and more preferably 500 or above. Within these ranges, the effect of this embodiment will tend to be demonstrated more effectively.

The epoxy compound preferably has an epoxy equivalent of 100 g/eq or larger or 100 g/mol or larger, which is more preferably 200 g/eq or larger or 200 g/mol or larger. Meanwhile, the epoxy compound preferably has an epoxy equivalent of 1500 g/eq or smaller or 1500 g/mol or smaller, which is more preferably 900 g/eq or smaller or 900 g/mol or smaller, and even more preferably 800 g/eq or smaller or 800 g/mol or smaller.

With the epoxy equivalent controlled at or above the lower limit value, the fluidity during extrusion or forming tends to improve. At or below the upper limit value, the hydrolysis resistance and weatherability tend to improve.

«Carbodiimide Compound»

In the resin composition of this embodiment, also a carbodiimide compound may be preferably used as the reactive compound. The carbodiimide compound has, in its molecule, a carbodiimide group (—N═C═N—). The carbodiimide compound applicable herein may be any of aliphatic carbodiimide compound having an aliphatic principal chain, alicyclic carbodiimide compound having an alicyclic principal chain, or aromatic carbodiimide compound having an aromatic principal chain. Among them, aliphatic carbodiimide compound that excels in reactivity with the polymer terminal is preferably used. The carbodiimide compound may be of either monomer-type or polymer-type. The polymer-type is preferred in this embodiment.

The aliphatic carbodiimide compound may be exemplified by diisopropylcarbodiimide, and dioctyldecylcarbodiimide.

The alicyclic carbodiimide compound is preferably exemplified by dicyclohexylcarbodiimide, and poly(4,4'-dicyclohexylmethane carbodiimide). Poly(4,4'-dicyclohexylmethane carbodiimide) is particularly preferred.

Commercial product may be exemplified by "Carbodilite" (product name; from Nisshinbo Chemical Inc.).

The aromatic carbodiimide compound is exemplified by mono or dicarbodiimide compound such as diphenylcarbodiimide, di-2,6-dimethylphenylcarbodiimide, N-triyl-N'-phenylcarbodiimide, di-p-nitrophenylcarbodiimide, di-p-aminophenylcarbodiimide, di-p-hydroxyphenylcarbodiimide, di-p-chlorophenylcarbodiimide, di-p-methoxyphenylcarbodiimide, di-3,4-dichlorophenylcarbodiimide, di-2,5-dichlorophenylcarbodiimide, di-o-chlorophenylcarbodiimide, p-phenylene-bis-di-o-triyl carbodiimide, p-phenylene-bis-dicyclohexyl carbodiimide, p-phenylene-bis-di-p-chlorophenylcarbodiimide, and ethylene-bis-diphenylcarbodiimide; and polycarbodiimide compound such as poly(4,4'-diphenylmethane carbodiimide), poly(3,5'-dimethyl-4,4'-biphenylmethane carbodiimide), poly(p-phenylene carbodiimide), poly(m-phenylene carbodiimide), poly(3,5'-dimethyl-4,4'-diphenylmethane carbodiimide), poly(naphthylene carbodiimide), poly(1,3-diisopropylphenylene carbodiimide), poly(1-methyl-3,5-diisopropylphenylene carbodiimide), poly(1,3,5-triethylphenylene carbodiimide) and poly (triisopropylphenylene carbodiimide). Two or more kinds of these compound may be used in combination.

The carbodiimide preferably has a mass-average molecular weight of 10000 or smaller, which is more preferably 4000 or smaller. The lower limit is preferably 100 or above, and more preferably 500 or above.

Content of carbodiimido group contained in the carbodiimide compound is preferably 100 g/mol or more, in terms of carbodiimide equivalent (weight of carbodiimide compound [g] that gives 1 mol of carbodiimido group), more preferably 200 g/mol or more, and more preferably 235 g/mol or more. The upper limit value is preferably 1000 g/mol or below, more preferably 800 g/mol or below, and even more preferably 650 g/mol or below. Use within the aforementioned range can stably control the reaction with the polymer.

«Compound Having Oxazoline Group (Ring)»

The compound having oxazoline group (ring) may be exemplified by oxazoline, alkyl oxazoline (alkyl oxazoline having 1 to 4 carbon atoms, such as 2-methyloxazoline, and 2-ethyloxazoline), and bisoxazoline compound.

The bisoxazoline compound is exemplified by 2,2'-bis(2-oxazoline); 2,2'-bis(alkyl-2-oxazoline) [2,2'-bis($C_{1-6}$ alkyl-2-oxazoline) such as 2,2'-bis(4-methyl-2-oxazoline), 2,2'-bis (4-ethyl-2-oxazoline), and 2,2'-bis(4,4-dimethyl-2-oxazoline), etc.]; 2,2'-bis(aryl-2-oxazoline) [2,2'-bis(4-phenyl-2-oxazoline), etc.]; 2,2'-bis(cycloalkyl-2-oxazoline) [2,2'-bis(4-cyclohexyl-2-oxazoline), etc.]; 2,2'-bis(aralkyl-2-oxazoline) [2,2'-bis(4-benzyl-2-oxazoline), etc.]; 2,2'-alkylenebis(2-oxazoline) [2,2'-$C_{1-10}$ alkylenebis-(2-oxazoline), such as 2,2'-ethylenebis-(2-oxazoline), 2,2'-tetramethylenebis-(2-oxazoline), etc.]; 2,2'-alkylenebis (alkyl-2-oxazoline) [2,2'-$C_{1-10}$ alkylenebis($C_{1-6}$ alkyl-2-oxazoline) such as 2,2'-ethylenebis(4-methyl-2-oxazoline), and 2,2'-tetramethylenebis-(4,4-dimethyl-2-oxazoline), etc.]; 2,2'-arylenebis(2-oxazoline) [2,2'-(1,3-phenylene)bis-(2-oxazoline), 2,2'-(1,4-phenylene)bis-(2-oxazoline), 2,2'-(1,2-phenylene)bis-(2-oxazoline), 2,2'-diphenylenebis(2-oxazoline), etc.]; 2,2'-arylenebis(alkyl-2-oxazoline) [2,2'- phenylenebis-($C_{1-6}$ alkyl-2-oxazoline), such as 2,2'-(1,3-phenylene)bis-(4-methyl-2-oxazoline), 2,2'-(1,4-phenylene)bis-(4,4-dimethyl-2-oxazoline), etc.]; 2,2'-aryloxyalkanebis-(2-oxazoline) [2,2'-9,9'-diphenoxyethanebis-(2-oxazoline), etc.]; 2,2'-cycloalkylenehis(2-oxazoline) [2,2'-cyclohexylenebis-(2-oxazoline), etc.]; N,N'-alkylenebis-(2-carbamoyl-2-oxazoline) [N,N'—$C_{1-10}$ alkylenebis-(2-carbamoyl-2-oxazoline) such as N,N'-ethylenebis-(2-carbamoyl-2-oxazoline), and N,N'-tetramethylenebis-(2-carbamoyl-2-oxazoline), etc.]; N,N'-alkylenebis-(2-carbamoyl-alkyl-2-oxazoline) [N,N'—$C_{1-10}$ alkylenebis-(2-carbamoyl-$C_{1-6}$ alkyl-2-oxazoline) such as N,N'-ethylenebis-(2-carbamoyl-4-methyl-2-oxazoline), and N,N'-tetramethylenebis-(2-carbamoyl-4,4-dimethyl-2-oxazoline), etc.]; and N,N'-arylenebis-(2-carbamoyl-2-oxazoline) [N,N'-phenylenebis-(2-carbamoyl-oxazoline), etc.].

The compound having oxazoline group also includes vinyl polymers having oxazoline group (Epocros RPS Series, RAS Series, and RMS Series, etc., from Nippon Shokubai Co., Ltd.). Among these oxazoline compounds, preferred is bisoxazoline compound.

«Compound Having Oxazine Group (Ring)»

Oxazine or bisoxazine compound may be used as the compound having oxazine group (ring).

The bisoxazine compound is exemplified by 2,2'-bis(5,6-dihydro-4H-1,3-oxazine); 2,2'-bis(alkyl-5,6-dihydro-4H-1,3-oxazine) [2,2'-bis($C_{1-6}$ alkyl-5,6-dihydro-4H-1,3-oxazine) such as 2,2'-bis(4-methyl-5,6-dihydro-4H-1,3-oxazine), 2,2'-bis(4,4-dimethyl-5,6-dihydro-4H-1,3-oxazine), 2,2'-bis(4,5-dimethyl-5,6-dihydro-4H-1,3-oxazine), etc.]; 2,2'-alkylenebis-(5,6-dihydro-4H-1,3-oxazine) [2,2'-$C_{1-10}$ alkylenebis-(5,6-dihydro-4H-1,3-oxazine) such as 2,2'-methylenebis-(5,6-dihydro-4H-1,3-oxazine), 2,2'-ethylenebis-(5,6-dihydro-4H-1,3-oxazine), 2,2'-hexamethylenebis-(5,6-dihydro-4H-1,3-oxazine), etc.]; 2,2'-arylenebis-(5,6-dihydro-4H-1,3-oxazine) [2,2'-(1,3-phenylene)bis-(5,6-dihydro-4H-1,3-oxazine), 2,2'-(1,4-phenylene)bis-(5,6-dihydro-4H-1,3-oxazine), 2,2'-(1,2-phenylene)bis-(5,6-dihydro-4H-1,3-oxazine), 2,2'-naphthylenebis-(5,6-dihydro-4H-1,3-oxazine), 2,2'-diphenylenebis-(5,6-dihydro-4H-1,3-oxazine), etc.]; N,N'-alkylenebis-(2-carbamoyl-5,6-dihydro-4H-1,3-oxazine) [N,N'—$C_{1-10}$ alkylenebis-(2-carbamoyl-5,6-dihydro-4H-1,3-oxazine) such as N,N'-ethylenebis-(2-carbamoyl-5,6-dihydro-4H-1,3-oxazine), N,N'-tetramethylenebis-(2-carbamoyl-5,6-dihydro-4H-1,3-oxazine), etc.]; N,N'-alkylenebis-(2-carbamoyl-alkyl-5,6-dihydro-4H-1,3-oxazine) [N,N'—$C_{1-10}$ alkylenebis-(2-carbamoyl-$C_{1-6}$ alkyl-5,6-dihydro-4H-1,3-oxazine) such as N,N'-ethylenebis-(2-carbamoyl-4-methyl-5,6-dihydro-4H-1,3-oxazine), N,N'-hexamethylenebis-(2-carbamoyl-4,4-dimethyl-5,6-dihydro-4H-1,3-oxazine), etc.]; and N,N'-arylenebis-(2-carbamoyl-5,6-dihydro-4H-1,3-oxazine) [N,N'-phenylenebis-(2-carbamoyl-oxazine), etc.]. Among these oxazine compounds, bisoxazine compound is preferred.

«Compound Having Carboxy Group»

The compound having carboxy group (carboxylic acid compound) is exemplified by formic acid, acetic acid, propionic acid, acrylic acid, methacrylic acid, oxalic acid, malonic acid, succinic acid, maleic acid, fumaric acid, adipic acid, benzoic acid, phthalic acid, terephthalic acid, lactic acid, malic acid, tartaric acid, diphenolic acid, benzenesulfonic acid, toluenesulfonic acid, dodecylbenzenesulfonic acid, nonylbenzenesulfonic acid, nitrobenzenesulfonic acid, cyanobenzenesulfonic acid, hydroxybenzenesulfonic acid, methylsulfonic acid, trifluoromethanesulfonic acid, trifluoroacetic acid, nitrobenzenecarboxylic acid, cyanobenzenecarboxylic acid, hydroxybenzenecarboxylic acid, hydroxyacetic acid, and salts of these acids.

«Compound Having Amido Group»

The compound having amido group is exemplified by (meth)acrylamide, N-methylmethacrylamide, methylolated acrylamide, methylolated methacrylamide, ureido vinyl ether, β-ureidoisobutyl vinyl ether, and ureidoethyl acrylate.

Content of the reactive compound, when contained in the resin composition of this embodiment, is preferably 0.01 parts by mass or more, per 100 parts by mass of the resin component, which is more preferably 0.05 parts by mass or more, even more preferably 0.1 parts by mass or more, yet more preferably 0.5 parts by mass or more, and furthermore preferably 1.0 part by mass or more. At or above the lower limit value, the hydrolysis resistance and the weatherability tend to further improve. Meanwhile, the upper limit value of the content of the reactive compound, per 100 parts by mass of the resin component, is preferably 20 parts by mass or below, more preferably 15 parts by mass or below, even more preferably 10 parts by mass or below, yet more preferably 5 parts by mass or below, and furthermore preferably 2 parts by mass or below. At or below the upper limit value, the fluidity tends to be less likely to degrade, and the formability tends to improve.

The resin component may contain only one kind, or two or more kinds of the reactive compound. When two or more kinds are contained, the total content preferably falls within the aforementioned ranges.

<Other Components>

The resin composition of this embodiment may contain some other optional components besides those described previously, without seriously undermining the desired physical properties. Such other components are exemplified by various resin additives. Only one of such other components may be contained, or two or more kinds are contained according to freely selectable combination and proportion.

Other components are more specifically exemplified by stabilizer, mold releasing agent, UV absorber, antistatic agent, anti-clouding agent, anti-blocking agent, flow modifier, plasticizer, dispersion aid, and antibacterial agent. The resin composition of this embodiment preferably contains at least one of stabilizer or mold releasing agent.

The resin composition of this embodiment preferably contains substantially no pigment. The phrase " . . . contains substantially no . . . " means that the content of the pigment is 10% by mass or less of the dye contained in the resin composition of this embodiment, wherein the content is preferably 5% by mass or less, may be 3% by mass or less, and may even be 1% by mass or less.

Moreover, the resin composition preferably contains substantially no absorptive coloring matter. The phrase " . . . contains substantially no . . . " means that the content of the absorptive coloring matter is 10% by mass or less of the dye contained in the resin composition of this embodiment, wherein the content is preferably 5% by mass or less, may be 3% by mass or less, and may even be 1% by mass or less.

«Stabilizer»

The resin composition of this embodiment preferably contains a stabilizer. The stabilizer is preferably phosphorus-containing stabilizer or phenolic stabilizer.

The phosphorus-containing stabilizer usable herein may be any of known ones, which are exemplified by oxo acid of phosphorus such as phosphoric acid, phosphonic acid, phosphorous acid, phosphinic acid, and polyphosphoric acid; metal acid pyrophosphate such as sodium acid pyrophosphate, potassium acid pyrophosphate, and calcium acid pyrophosphate; phosphate salt of Group 1 or Group 2B metals such as potassium phosphate, sodium phosphate, cesium phosphate, and zinc phosphate; organophosphate compound, organophosphite compound, and organophosphonite compound. Organophosphite compound is particularly preferred.

The phenolic stabilizer is exemplified by hindered phenolic antioxidant.

Details of these compounds may be understood referring to the description in paragraphs [0105] to [0111] of WO2020/013127, the content of which is incorporated herein by reference.

Content of the stabilizer is usually 0.001 parts by mass or more per 100 parts by mass of the thermoplastic resin, and preferably 0.01 parts by mass or more, meanwhile usually 1 part by mass or less, and preferably 0.5 parts by mass or less. With the content of the stabilizer adjusted at or above the lower limit value of these ranges, the effect of the stabilizer will be more effectively obtainable. Meanwhile, with the content of the stabilizer adjusted at or below the upper limit value of these ranges, the effect will be demonstrated economically without saturating.

The resin composition of this embodiment may contain only one kind of, or two or more kinds of the stabilizer. When two or more kinds are contained, the total content preferably falls within the aforementioned ranges.

«Mold Releasing Agent»

The resin composition of this embodiment preferably contains a mold releasing agent (lubricant). The mold releasing agent is exemplified by aliphatic carboxylic acid, ester formed between aliphatic carboxylic acid and alcohol, aliphatic hydrocarbon compound having a number-average molecular weight of 200 to 15000, wax, and polysiloxane-based silicone oil.

Details of these compounds may be understood referring to paragraphs [0112] to [0121] of WO2020/013127, the content of which is incorporated herein by reference.

Content of the mold releasing agent is usually 0.001 parts by mass or more, per 100 parts by mass of the thermoplastic resin, and preferably 0.01 parts by mass or more, meanwhile, usually 2 parts by mass or less, and preferably 1 part by mass or less. With the content of the mold releasing agent adjusted to the lower limit value or above of the aforementioned range, a mold releasing effect will be obtainable more easily. With the content of the mold releasing agent adjusted to the upper limit value or below of the aforementioned range, a sufficient level of hydrolysis resistance will be obtainable, and die pollution during injection molding will be less likely to occur.

<Physical Properties of Resin Composition>

The resin composition of this embodiment preferably excels in heat resistance. More specifically, the resin composition of this embodiment preferably demonstrates a deflection temperature under load, measured in compliance with JIS K7191, of 100° C. or higher, which is more preferably 110° C. or higher, even more preferably 130° C. or higher, yet more preferably 150° C. or higher, furthermore preferably 170° C. or higher, and again furthermore preferably 190° C. or higher. The upper limit value, although not specifically limited, is practically 250° C. or below.

The resin composition of this embodiment excels in color fading after weatherability test. The resin composition of this embodiment, when formed into 1.5 mm thick and measured before and after 500-hour treatment in compliance with ASTM 155-1, preferably demonstrates a color difference ΔE in the specular component included (SCI) mode of smaller than 5, which is more preferably 4.5 or smaller, more preferably 4.0 or smaller, even more preferably 3.7 or smaller, yet more preferably 3.4 or smaller, may be 3.0 or smaller, and may even be 2.0 or smaller. The lower limit value, although not specifically limited, is practically 0.1 or above.

The resin composition of this embodiment, when formed into 1.5 mm thick and measured before and after 500-hour treatment in compliance with ASTM 155-1, preferably demonstrates a color difference ΔE in the specular component excluded (SCE) mode of smaller than 20, which is more preferably 15 or smaller, may be 12 or smaller, and may even be 10 or smaller. The lower limit value, although not specifically limited, is practically 0.1 or above.

The resin composition of this embodiment also preferably demonstrates high transmittance. For example, the resin composition, when foamed into 1.5 mm thick, and measured at 1064 nm wavelength, preferably demonstrates a light transmittance of 20% or larger, which is more preferably 30% or larger, even more preferably 40% or larger, may be 45% or larger, may be 50% or larger, may be 55% or larger, and may even be 60% or larger. The upper limit value, although not specifically limited, is practically 90% or below.

The resin composition of this embodiment also preferably excels in tensile strength. For example, the tensile strength measured in compliance with JIS K7161 is preferably 100 MPa or larger, more preferably 110 MPa or larger, even more preferably 120 MPa or larger, and yet more preferably 130 MPa or larger. The upper limit value, although not specifically limited, is practically 200 MPa or below, for example.

The resin composition of this embodiment preferably demonstrates a retention of tensile strength, after 100-hour PCT treatment, of 40% or larger, which is more preferably 50% or larger, may be 55% or larger, may be 60% or larger, may be 650 or larger, and may even be 70% or larger. The upper limit value, although not specifically limited, is practically 90% or below, for example.

The resin composition of this embodiment preferably demonstrates a flexural strength, measured in compliance with JIS K7171, of 100 MPa or larger, which is more preferably 140 MPa or larger, more preferably 150 MPa or larger, even more preferably 170 MPa or larger, yet more preferably 180 MPa, and furthermore preferably 190 MPa or larger. The upper limit value, although not specifically limited, is practically 280 MPa or below, for example.

The resin composition of this embodiment preferably demonstrates a flexural modulus, measured in compliance with JIS K7171, of 4000 MPa or larger, which is more preferably 5000 MPa or larger, even more preferably 6000 MPa or larger, yet more preferably 7000 MPa or larger, furthermore preferably 8000 MPa or larger, and again furthermore preferably 9000 MPa or larger. The upper limit value, although not specifically limited, is practically 20000 MPa or below, for example.

The deflection temperature under load, the color difference ΔE in the SCI mode, the color difference ΔE in the SCE mode, the transmittance, the tensile strength, the retention of tensile strength after 100-hour PCT treatment, the flexural strength and the flexural modulus will follow the description later in EXAMPLES.

<Method for Preparing Resin Composition>

The resin composition of this embodiment may be prepared by any of ordinary methods for preparing resin composition. Commonly, the individual components and various optional additives are combined and thoroughly mixed, and then melt-kneaded with use of a single-screw or twin-screw extruder. Alternatively, the individual components may be fed through a feeder into an extruder, without preliminarily mixing them, or after preliminarily mixing only a part of them, and melt-kneaded to prepare the resin composition of this embodiment. Still alternatively, a part of the components, such as dye, is melt-kneaded with a thermoplastic resin to prepare a masterbatch, to which the residual components may be blended and melt-kneaded.

Note that the inorganic filler such as glass fiber, when used, is preferably side-fed through a side feeder arranged in the middle of a cylinder of the extruder.

Heating temperature in the melt kneading is selectable usually in the range from 220 to 300° C. Too high temperature will tend to make the resin composition more likely to emit decomposition gas, and would cause clouding. Hence, a screw arrangement is preferably selected taking shear heating, for example, into consideration. An antioxidant or heat stabilizer is preferably used in order to suppress decomposition during kneading or post processes.

<Method for Manufacturing Formed Article>

Method for manufacturing the formed article of this embodiment is not specifically limited, and may be freely selectable from known forming methods usually employed for resin compositions. The method is exemplified by injection molding, ultra-high-speed injection molding, injection compression molding, two color molding, hollow molding such as gas-assisted molding, molding with use of heat insulation dies, molding with use of rapid heating dies, foam molding (including supercritical fluid), insert molding, IMC (in-mold coating) molding, extrusion molding, sheet forming, thermoforming, rotational molding, laminate molding, press molding and blow molding. Among them, injection molding is preferred.

Detail of the injection molding may be understood referring to the description in paragraphs [0113] to [0116] of JP 6183822 B, the content of which is incorporated herein by reference.

<Kit>

The kit of this embodiment contains the resin composition of this embodiment, and an absorptive resin composition that contains a thermoplastic resin and an absorptive coloring matter. The thus arranged kit will excel in laser weldability, and is preferably used as a kit for manufacturing a formed article by laser welding.

That is, the resin composition of this embodiment contained in the kit serves as a transmissive resin composition, and a formed article formed of such transmissive resin composition serves as the transmissive resin member for the laser light in laser welding. Meanwhile, a formed article formed of the absorptive resin composition serves as the absorptive resin member for the laser light in laser welding.

The resin composition of this embodiment is particularly suitable for Galvano-scanning laser welding. Galvano-scanning laser welding is also referred to as quasi-simultaneous welding that relies upon a system with use of built-in Galvano mirrors for scanning the laser light. Use of Galvano-scanning laser welding can heat the entire range of the weld portion almost at a time, so that the obtainable laser-welded article will tend to have reduced residual stress.

«Light-Absorptive Resin Composition»

The light-absorptive resin composition used in this embodiment contains a thermoplastic resin and an light-absorptive coloring matter. An inorganic filler may further be contained.

The thermoplastic resin is exemplified by polyamide resin, olefinic resin, vinyl-based resin, styrene-based resin, acrylic resin, polyphenylene ether resin, polyester resin, polycarbonate resin, and polyacetal resin. From the viewpoint of good compatibility with the light-transmissive resin composition (the resin composition of this embodiment), particularly preferred are polyester resin and polycarbonate resin, and more preferred is polyester resin. Only one kind of, or two or more kinds of thermoplastic resin may be used.

The resin component used for the light-absorptive resin composition is preferably same as the resin component contained in the resin composition of this embodiment (light-transmissive resin composition).

The inorganic filler is preferably same as the inorganic filler described in relation to the resin composition of this embodiment (light-transmissive resin composition), along with equivalent preferred ranges for the amount of blending and so forth.

The light-absorptive coloring matter has a maximum absorption in the wavelength range of the light to be irradiated, which is in the wavelength range from 800 nm to 1100 nm in this embodiment. The light-absorptive coloring matter is defined by a coloring matter that makes a blend demonstrate a light transmittance of smaller than 20%, and further 10% or smaller, when measured by the measurement method described later in EXAMPLES, typically when 0.3 parts by mass of such coloring matter (coloring matter presumed to be a light-absorptive coloring matter) is blended with a polybutylene terephthalate resin (for example, Novaduran (registered trademark) 5008), 30% by mass of glass fiber (for example, T-127 (trade name), from Nippon Electric Glass Co., Ltd), totaling 100% by mass.

The light-absorptive coloring matter is specifically exemplified by inorganic pigments [black pigments such as carbon black (acetylene black, lamp black, thermal black, furnace black, channel black, Ketjen black, etc.), red pigment such as red iron oxide, orange pigment such as molybdate orange, white pigment such as titanium oxide]; and organic pigments (yellow pigment, orange pigment, red pigment, blue pigment, green pigment, etc.). Among them, the inorganic pigments are preferred for their high concealability as a whole, and black pigment is further preferred. These light-absorptive coloring matters may be used in combination of two or more kinds thereof. Content of the light-absorptive coloring matter is preferably 0.01 to 30 parts by mass, per 100 parts by mass of the resin component.

In the kit, the component of the light-transmissive resin composition of this embodiment excluding the light-transmissive coloring matter and the inorganic filler, and, the component of the light-absorptive resin composition excluding the light-absorptive coloring matter and the inorganic filler, are preferably commonalized up to a degree of 80% by mass or more, which is more preferably 90% by mass or more, and even more preferably 95 to 100% by mass.

The kit can attain a laser weld strength of 800 N or larger, which may further be 1000 N or larger, or 1200 N or larger. The upper limit value of the laser weld strength, although not specifically limited, is practically 4000 N or below. The laser weld strength may be measured according to the description later in EXAMPLES.

«Laser Welding Method»

Next, the laser welding method will be explained. In this embodiment, a formed article (transmissive resin member) formed of the resin composition of this embodiment, and a formed article formed of the light-absorptive resin composition (absorptive resin member) may be laser-welded to manufacture the formed article. Laser welding can tightly weld the transmissive resin member and the absorptive resin member, without using an adhesive. The resin composition of this embodiment is particularly suitable for Galvano-scanning laser welding. Use of Galvano-scanning laser welding can heat the entire range of the weld portion almost at a time, so that the obtainable laser-welded article will tend to have reduced residual stress.

Shape of the members, although not specifically limited, usually has at least a surface-contact part (flat or curved), since the members are used in a joined form as a result of laser welding. In the laser welding, the laser light transmitted through the transmissive resin member is absorbed by the absorptive resin member, causing melting and welding of both members. Since the formed article formed of the resin composition of this embodiment has high transmittance of laser light, and is therefore suitably used as the transmissive resin member. Thickness of the member through which the laser light transmits (thickness of a part through which the laser light transmits, when viewed in the direction of transmission of laser light) is suitably determined, considering application, chemical composition of the resin composition and so forth, which is typically 5 mm or smaller, and is preferably 4 mm or smaller.

Laser light source used for laser welding may be determined depending on light absorption wavelength of the light-absorptive coloring matter, for which laser in a wavelength range of 800 to 1100 nm is preferred. Type of the laser light to be irradiated is exemplified by solid-state laser, fiber laser, semiconductor laser, gas laser, and liquid laser. For example, YAG (yttrium aluminum garnet crystal) laser (1064 nm or 1070 nm wavelength), LD (laser diode) (808 nm, 840 nm, 940 nm, or 980 nm wavelength) are preferably used. Among them, laser light of 940 nm, 980 nm, or 1070 nm wavelength is preferred.

The laser preferably has a focal diameter of 0.1 mm or larger, preferably 0.2 mm or larger, and even more preferably 0.5 mm or larger. At or above the upper limit value, weld strength of the laser-weld portion may be enhanced. Meanwhile, the laser irradiation diameter is preferably 30 mm or smaller, more preferably 10 mm or smaller, and even more preferably 3.0 mm or smaller. At or below the lower limit value, the weld width is more effectively controllable.

The focal diameter of laser is selectable depending on the width or height of the welding face.

The laser light may be focused on, or defocused from the joined face, which is suitably selectable depending on a desired welded article.

Laser output is preferably 1 W or larger, more preferably 10 W or larger, even more preferably 30 W or larger, and yet more preferably 100 W or larger. At or above the lower limit value, a sufficient level of weld strength is obtainable even in a short welding time. Meanwhile, the laser output is preferably 1000 W or smaller, more preferably 500 W or smaller, even more preferably 400 W or smaller, and yet more preferably 300 W or smaller. At or below the upper limit value, equipment cost for laser welding may be effectively suppressed from becoming too expensive.

Laser scanning speed is preferably 10 mm/s or faster, more preferably 30 mm/s or faster, even more preferably 50 mm/s or faster, and yet more preferably 500 mm/s or faster. At or above the lower limit value, residual stress in the laser-welded article will be reduced more effectively. Meanwhile, the laser scanning speed is preferably 20000 mm/s or slower, more preferably 10000 mm/s or slower, even more preferably 5000 mm/s or slower, and yet more preferably 3000 mm/s or slower. At or below the upper limit value, the welded article will have a more sufficient level of weld strength. From the viewpoints of welding efficiency, weld strength, weld appearance and equipment load, the laser scanning is preferably conducted while controlling laser output, planned welding line, scanning speed, and/or scanning mode, depending on the shape of welding faces.

More specifically, in an exemplary case where the transmissive resin member and the absorptive resin member are welded, first, the welding sites of both members are brought into contact. The welding sites herein are preferably kept in surface contact between flat faces, curved faces, or combination of flat and curved faces. In order to keep the members stacked, pressure may be applied from the transmissive member side, while placing thereon, or on the side of laser irradiation, a transparent member such as glass plate, quartz plate, or acrylic plate. In particular, use of the glass plate or quartz plate is suitable for promoting heat radiation during the laser welding, and to obtain good outer appearance. Pressurizing may alternatively be effected with use of a metal plate that surrounds the periphery of a site to be welded of the transmissive member.

Next, the laser light is irradiated through the transmissive resin member. The laser light herein may be optionally condensed through a lens, on the interface between both members. The condensed beam transmits through the transmissive resin member, absorbed at around the surface of the absorptive resin member, generates heat, and melts the resin. The heat is then conducted by thermal conduction also to the transmissive resin member to melt it, to form a molten pool at the interface between both members. Both members are welded after cooled.

The formed article, composed of the transmissive resin member and the absorptive resin member thus welded, has high weld strength. Note that the formed article in the context of this embodiment encompasses not only finished product or parts, but also members that compose a part of them.

The formed article obtained by laser welding in this embodiment excels in mechanical strength and weld strength, and causes less damage on the resin even after laser irradiation, and is therefore applicable to various purposes, such as a variety of storage containers, electrical/electronic equipment parts, office automation (OA) equipment parts, home electric appliance parts, machine and mechanism parts, and vehicle mechanism parts. In particular, the formed article is suitable for food container, drug container, oil and fat products container, vehicle hollow part (various tanks, intake manifold part, camera body, etc.), vehicle electrical part (various control units, ignition coil part, etc.), car-borne electronic component and sensor component (case of millimeter-wave radar, LIDAR, ECU case, or sonar sensor, etc.), electronically controlled throttle body, motor part, various sensor parts, connector part, switch part, circuit breaker part, relay part, coil part, transformer part, lamp part, and so forth. The resin composition and the kit of this embodiment are particularly suitable for UV exposed article.

Note that UV exposed article in this embodiment means a formed article on which UV light is directly irradiated, a formed article on which reflected UV light is irradiated, and, a formed article on which UV light is indirectly irradiated such as through a transparent formed article. This embodiment is particularly suitable for the formed article on which UV light is directly irradiated, and a formed article on which reflected UV light is irradiated. The formed article herein encompasses component, case and other formed article. More specifically, the UV exposed article includes car-borne camera component for in-vehicle and/or outside-vehicle installation, car-borne camera module that contains the car-borne camera component, case of millimeter-wave radar for in-vehicle and/or outside-vehicle installation, millimeter-wave radar module that contains the millimeter-wave radar, component in vehicle headlight, case of electric parking brake (EPB), and case of sensor case of sonar sensor and so forth. Particularly preferred are car-borne camera component, case of millimeter-wave radar for in-vehicle and/or outside-vehicle installation, case of electric parking brake, and case of sensor case.

EXAMPLES

This invention will further be detailed referring to Examples. All materials, amounts of consumption, proportions, process details and procedures described in Examples below may suitably be modified, without departing from the spirit of this invention. Hence, the scope of this invention is by no means limited to specific Examples below.

In a case where any measuring instrument used in EXAMPLES become unavailable typically due to discontinuation, the measurement may be conducted with use of other instrument having equivalent performances.

1. Raw Materials

Raw materials summarized in Table 1 and Table 2 below were used.

TABLE 1

| Component | Abbr. | |
|---|---|---|
| Polybutylene terephthalate resin | PBT | Polybutylene terephthalate resin<br>Product name: Novaduran (registered trademark) 5008, from Mitsubishi Engineering-Plastics Corporation<br>Intrinsic viscosity: 0.85 dL/g<br>Terminal carboxy qroup content = 20 eq/ton, Tg = 50° C. |
| Polyester resin | PET | Product name: Novapet (registered trademark) PBK1, from Mitsubishi Chemical Corporation<br>Intrinsic viscosity: 0.64 dL/g<br>Terminal carboxy group content = 36 eq/ton, Tg = 75° C. |
| Polycarbonate resin | PC | Produt name: lupilon (registered trademark) H4000, from Mitsubishi Engineering-Plastics Corporation<br>Viscosity-average molecular weight = 16,000, Tg = 150° C. |
| Aromatic vinyl-based resin | HIPS | Rubber-modified polystyrene resin (HIPS)<br>Product name: HT478, from PS Japan Corporation<br>Butadiene rubber content: 7.4% by mass<br>Mass average molecular weiqht: ca. 200,000, Tg = 95° C. |
| | AS | Acrylonitrile-styrene copolymer<br>Product name: GR-AT-R, from Denka Co., Ltd.<br>MFR: 11 g/10 min (220° C., 98N)<br>Acrylonitrile content: 31% by mass, Tg = 100° C. |
| Glass fiber | GF | Product name: T-127, from Nippon Electric Glass Co., Ltd.<br>Number-average fiber diameter: 13 μm, number-average fiber length: 3 mm |
| Epoxy compound | EP | Ortho cresol novolac-type epoxy resin<br>Polyglycidyl ether compound of o-cresol formaldehyde polycondensate<br>Product name: YDCN704, from Nippon Steel & Sumikin Materials Co., Ltd.<br>Epoxy equivalent: 207 (g/eq) |

TABLE 2

| Component | Abbr. | |
|---|---|---|
| Phenolic stabilizer | | Pentaerythritoltetrakis[3-(3,5-di-tert-butyl-4-hydroxyphenyl)propionate]<br>Product name: ADK STAB AO-60, from ADEKA Corporation |
| Phosphorus-containing stabilizer | | Mixture of compounds with n = 1, 2 in $O{=}P(OH)_n(OC_{13}H_{37})_{3-n}$<br>Product name: ADK STAB AX-71, from ADEKA Corporation |
| Mold releasing agent | | Pentaerythritol tetrastearate<br>Product name: Unister H476D, from Nippon Oil & Fats Co., Ltd. |
| Carbon black masterbatch | | Carbon black masterbatch<br>Carbon black/PBT = 19/81 (mass ratio)<br>Carbon black: product name: #650B, from Mitsubishi Chemical Corporation, average primary particle size = 22 nm, coloring power = 125%<br>Polybutylene terephthalate: Novaduran (registered trademark) 5008, from Mitsubishi Engineering-Plastics |
| Colorant | DY1 | Anthraquinone-based dye (C.I. Solvent Green 3)<br>Product name: Sumiplast Green G, from Sumika Chemtex Co., Ltd. |
| | DY2 | Perinone-based dye (C.I. Solvent Red 179)<br>Product name: Plast Red 8370, from Arimoto Chemical Co., Ltd. |

TABLE 2-continued

| Component | Abbr. | |
|---|---|---|
| | DY3 | Anthraquinone-based dye (C.I. Solvent Blue 97) Product name: KP Plast Blue R, from Kiwa Chemical Industry Co., Ltd. |
| | DY4 | Anthraquinone-based dye (C.I. Solvent yellow 163) Product name: KP Plast Yellow HK, from Kiwa Chemical Industry Co., Ltd. |
| | PG | Monoazolake red pigment (PR151):monoazolake yellow pigment (PY183):phthalocyanine blue pigment (PB15:3) = 2:2:1 (mass ratio) |

The masterbatch of carbon black was prepared according to the method below.

Polybutylene terephthalate resin and carbon black, with a mass proportion of 81:19, were placed in a stainless steel tumbler, and mixed under stirring for one hour. The obtained mixture was placed in a main hopper of a 30 mm vented twin-screw extruder (TEX30a, from the Japan Steel Works, Ltd.), kneaded at a preset temperature of extruder barrel of 260° C., a die temperature of 250° C., a screw rotation speed of 200 rpm, and an ejection volume of 40 kg/hours, and extruded into strands, to obtain a masterbatch of the carbon black.

<Measurement of Glass Transition Temperature of Thermoplastic Resin>

The glass transition temperature was measured with use of a differential scanning calorimeter, in compliance with JIS K7121. More specifically, approximately 0.01 g of the resin was weighed on an aluminum pan, and then subjected to calorimetry while heating the sample from room temperature (23° C.) up to 300° C., at a heating rate of 20° C./min. The glass transition temperature (Tg) of the thermoplastic resin was given by an intersection at which the obtained DSC curve crosses a line that passes midpoints between two base lines appeared in the DSC curve before and after specific heat changes. The glass transition temperature was given in ° C.

The differential scanning calorimeter used here was "Pyris Diamond" from PerkinElmer, Inc.

<Measurement of Epoxy Equivalent>

Epoxy equivalent was measured in compliance with JIS K7236, and denoted in eq/g.

<Preparation of Colorant>

Colorant used herein was prepared by weighing the individual dyes, and stirring for 5 hours.

2. Examples 1 to 10, Comparative Examples 1 to 4

<Manufacture of light-transmissive Resin Composition (Pellet)>

Components other than the glass fiber, summarized in Tables 3 to 5, were placed in a stainless steel tumbler, and mixed under stirring for one hour. The individual components in Tables 3 to 5 are denoted in parts by mass. The obtained mixture was placed in a main hopper of a 30 mm vented twin-screw extruder (TEX30α, from the Japan. Steel. Works, Ltd.), the glass fiber (GE) was fed through the seventh side feeder from the hopper, the content was kneaded at a preset temperature of extruder barrels C1 to C15 of 260° C., a die temperature of 250° C., a screw rotation speed of 200 rpm, and an ejection volume of 40 kg/hours, and extruded into strands, to obtain a pellet of the resin composition.

<Molding of Weathering Test Plate>

The thus obtained resin composition pellet was dried at 120° C. for 7 hours, and then injection-molded with use of an injection molding machine (#NEX80-9E#, from Nissei Plastic Industrial Co., Ltd.) at a cylinder temperature of 260° C., a die temperature of 60° C., and under the conditions below, to manufacture a 60 mm×60 mm×1.5 mm thick flat test specimen for measurement of transmittance.

(Injection Conditions)

Packing time: 10 sec
Cooling time: 10 sec
Injection speed: 90 mm/sec
Back pressure: 5 MPa
Screw speed: 100 rpm <Manufacture of Transmissive Resin Member>

The thus obtained resin pellet was dried at 120° C. for 7 hours, and then injection-molded with use of an injection molding machine ("J55", from the Japan Steel Works, Ltd.), at a cylinder temperature of 260° C. and a die temperature of 60° C., to manufacture a 1.5 mm thick molded article (transmissive resin member I) as illustrated in FIG. 1.

<Manufacture of Absorptive Resin Member>

Components other than the glass fiber, summarized in Table 6, were placed in a stainless steel tumbler, and mixed under stirring for one hour. The individual components in Table 6 are denoted in parts by mass. The obtained mixture was placed in a main hopper of a 30 mm vented twin-screw extruder (TEX30a, from the Japan Steel Works, Ltd.), the glass fiber (GF) was fed through the seventh side feeder from the hopper, the content was kneaded at a preset temperature of extruder barrels C1 to C15 of 260° C., a die temperature of 250° C., a screw rotation speed of 200 rpm, and an ejection volume of 40 kg/hours, and extruded into strands, to obtain a pellet of the resin composition.

Figure 2:
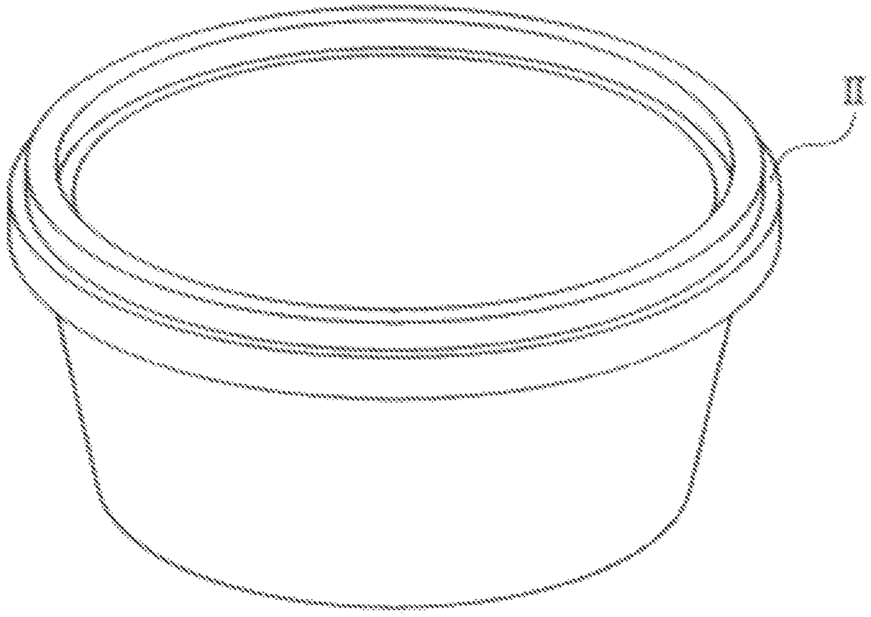
FIG. 2 A schematic drawing illustrating a test specimen used for measuring laser weld strength in Example.
Figure 2:
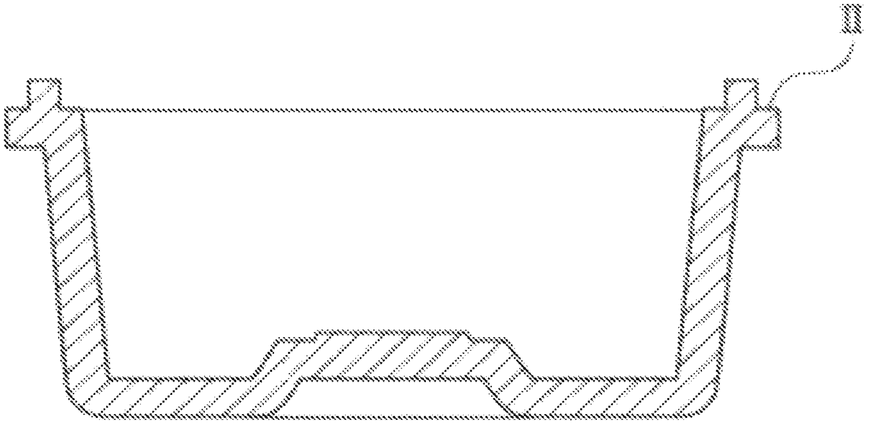

The thus obtained resin pellet was dried at 120° C. for 7 hours, and then injection-molded with use of an injection molding machine ("J55", from the Japan Steel Works, Ltd.), at a cylinder temperature of 260° C. and a die temperature of 60° C., to manufacture a molded article (absorptive resin member II) as illustrated in FIG. 2.

<Manufacture of Dumbbell Specimen for Physical Property Measurement>

The thus obtained pellet of the resin composition was dried at 120° C. for 7 hours, and then injection-molded with use of an injection molding machine ("J-85AD-60H", from the Japan Steel Works, Ltd.) in compliance with JIS 7139 and JIS 7152, to manufacture a 4.0 mm thick ISO multipurpose test specimen. From this test specimen, test specimens for bending test and measurement of deflection temperature under load were formed in compliance with JIS 7171 and JIS 7191.

<Color Difference ΔE (ASTM 155-1, 500 h) in SCE Mode>

The thus obtained weathering test plate was treated with use of a xenon arc weathering tester (ATLAS Ci4000 Xenon Weather-Ometer), under conditions specified by ASTM 155-1 for 500 hours. Color tone L*a*b' (SCE) of the plate was measured before and after the treatment, with use of a spectrophotometer (CM-3600d, from Konica Minolta Optics, Inc.) in compliance with ISO 7724/1, D65/10 (reflective lighting, light receiving angle 10°), equipped with a target mask MAV (8 mm in diameter), in the specular component excluded (SCE) mode. Change of color tone ΔE before and after the treatment was calculated.

<Color Difference ΔE (ASTM 155, 500 h) in SCT Mode>

The thus obtained weathering test plate was treated with use of a xenon arc weathering tester (ATLAS Ci4000 Xenon Weather-Ometer), under conditions specified by ASTM 155-1 for 500 hours. Color tone L*a*b* (SCE) of the plate was measured before and after the treatment, with use of a spectrophotometer (CM-3600d, from Konica Minolta Optics, Inc.) in compliance with ISO 7724/1, D65/10 (reflective lighting, light receiving angle 10°), equipped with a target mask MAV (8 mm in diameter), in the specular component excluded (SCE) mode. Change of color tone ΔE before and after the treatment was calculated.

<Light-Transmittance Through 1.5 mm Thick Plate>

Transmittance (%) at 1064 nm wavelength of the thus obtained weathering test plate (60 mm×60 mm×1.5 mm thick) was measured at a point 45 mm away from the gate side portion, and at the center of the width of the test specimen, with use of a UV-visible-near infrared spectrophotometer.

The UV-visible-near infrared spectrophotometer used here was "UV-3100PC" equipped with an integrating sphere, from Shimadzu Corporation.

<Tensile Strength>

The thus molded ISO multi-purpose test specimen (4.0 mm thick) was subjected to measurement of tensile strength (MPa) in compliance with JIS 7161.

<Retention Ratio of Tensile Strength after 100-Hour PCT Treatment>

The thus molded ISO multi-purpose test specimen (4.0 mm thick) was treated in a pressure cooker tester at a temperature of 121° C., 100% relative humidity, and a pressure of 2 atm for 100 hours, and similarly subjected to measurement of tensile strength (after 100-hour treatment) (in MPa). Also the retention ratio of tensile strength was calculated (in %).

The pressure cooker tester used here was EH8-221M, from ESPEC Corporation.

Retention ratio of tensile strength (1)=[(Tensile strength after 100-hour PCT treatment)/(Initial tensile strength)]×100

<Flexural Strength and Flexural Modulus>

The thus manufactured bending test specimen (4.0 mm thick) was subjected to measurement of flexural strength and flexural modulus in compliance with JIS K7171 (in MPa).

<Deflection Temperature under Load (DTUL)>

The thus manufactured load deflection test piece (4.0 mm thick) was annealed in a thermostat chamber at 160° C. for 3 hours. The thus annealed test piece was moisture-conditioned in an environment at room temperature (23° C.), 50% RH. The test piece was then placed under a flexural stress of 1.8 MPa in compliance with JIS K7191, to measure the deflection temperature under load.

<Weld Strength>

The thus obtained transmissive resin members (Examples 1 to 10, Comparative Examples 1, 3, 4) and the thus obtained absorptive resin member were individually used for laser welding. Note, for Comparative Example 2, two pieces of the transmissive resin member of Comparative Example 2 were laser welded.

Figure 3:
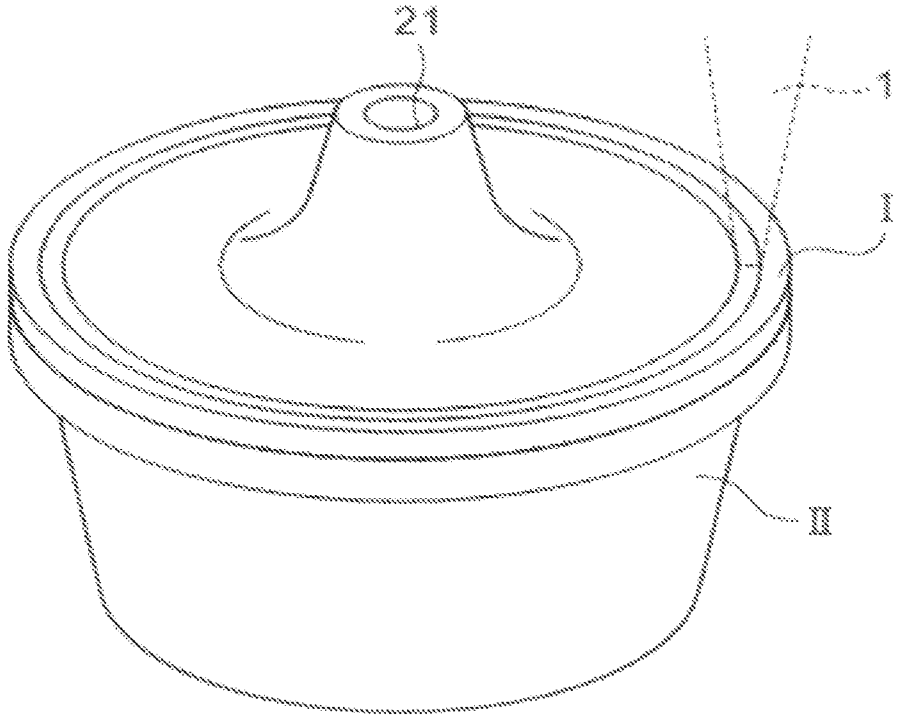
FIG. 3 A schematic drawing illustrating a test specimen used for measuring laser weld strength in Example.
Figure 3:
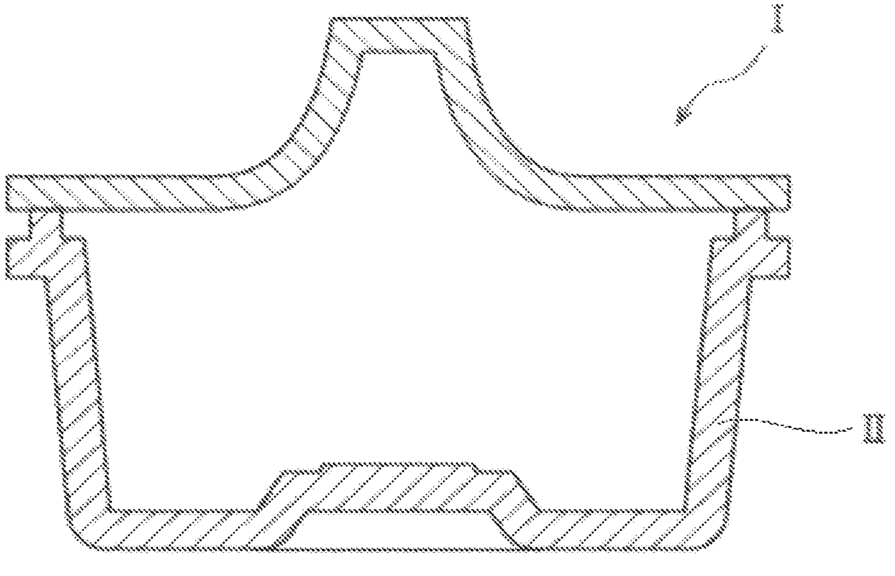

The transmissive resin member and the absorptive resin member were drilled to form holes 21, 22 respectively as illustrated in FIG. 3, the box-like absorptive resin member II and the lid-like transmissive resin member I were stacked while placing inside thereof jigs 23, 24 for measuring weld strength. A laser light source was arranged above a flange part which is an overlapped portion of the transmissive resin member I and the absorptive resin member II, and the laser was irradiated thereon according to the conditions below, while pressurizing with use of glass plates the overlapped portion of the transmissive resin member I and the absorptive resin member II, from both side inwardly in the thickness direction under a pressing force (pressing force during welding) of 4.92 N/mm. Reference numeral 1 in FIG. 3 denotes a part irradiated with the laser.

A welding apparatus is as follows.

«Welding Conditions»

Position of the laser scanner was adjusted by defocusing the laser light so as to give a spot diameter of 2 mm on the weld face.

Welding Apparatus

Laser apparatus: YLR-300-AC-Y14, from IPG Photonics Corporation

Wavelength: 1070 nm

Collimator: 7.5 mm

Laser type: fiber

Laser output: 150 W

Galvano scanner: Fiber Elephants 21, from ARGES GmbH

Aperture: 21 mm

Laser irradiation speed: 900 mm/s

Number of laps of laser irradiation: 5 laps

Circumference of welding portion: 137 mm

<Evaluation of Laser Weld Strength: Cup Shape>

Figure 4:
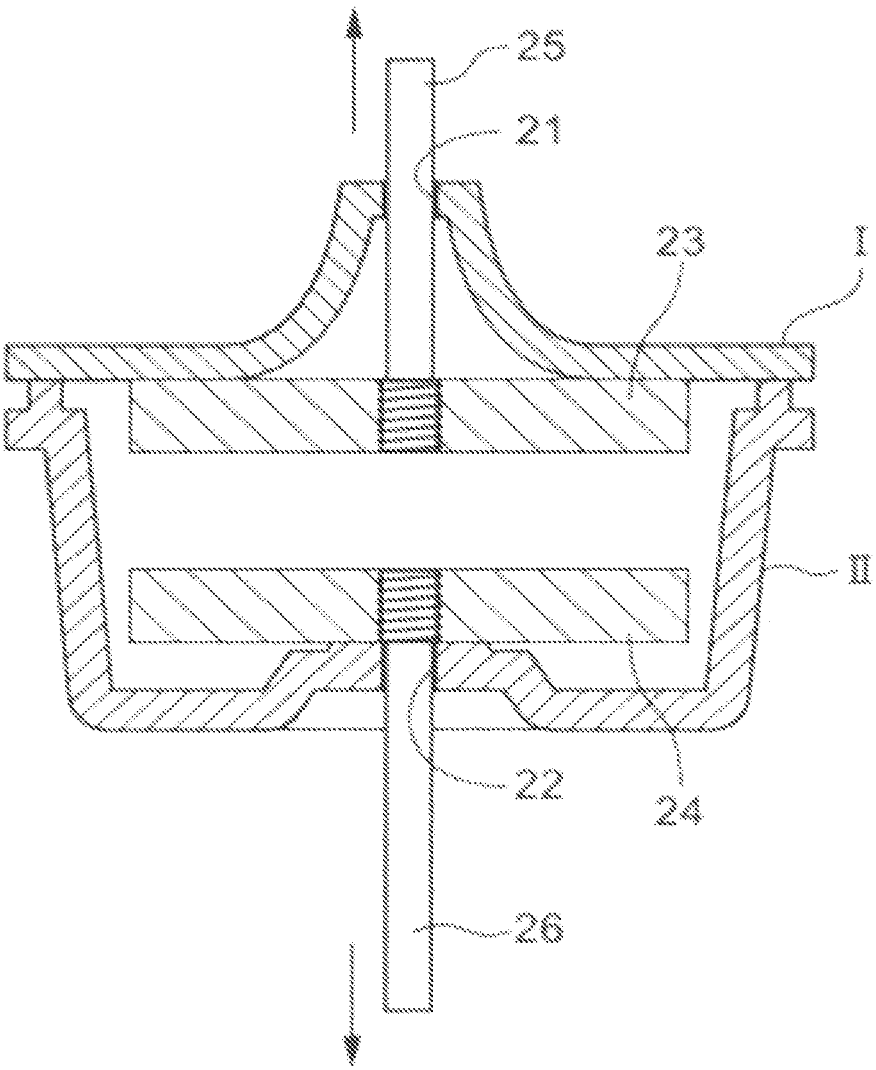
FIG. 4 A schematic drawing illustrating a method for measuring laser weld strength in Example.

As illustrated in FIG. 4, measurement jigs 25, 26 were inserted respectively through the top face and the bottom face of the box composed of the transmissive resin member I and the absorptive resin member II manufactured above, and respectively joined with the jigs 23, 23 housed in the box. The jigs were then pulled upward and downward (tensile speed: 5 mm/min), and a strength at which the transmissive resin member I and the absorptive resin member II separate (weld strength) was measured.

The apparatus used herein was a 1 t Tensilon universal test machine (10 kN loadcell) from ORIENTEC Co., Ltd. Results are summarized in Tables below. Cases where the welding failed were denoted by "x".

TABLE 3

| | | | Example 1 | Example 2 | Example 3 | Example 4 | Example 5 |
|---|---|---|---|---|---|---|---|
| Chemical composition of transmissive resin member | Polyester resin | PBT | 60 | 70 | 70 | 80 | 90 |
| | | PET | | | | | |
| | Polycarbonate resin | PC | 40 | 30 | 30 | 20 | 10 |
| | Aromatic vinyl-based resin | HIPS | | | | | |
| | | AS | | | | | |
| | Glass fiber | GF | 44.01 | 44.01 | 43.38 | 44.01 | 44.01 |
| | Epoxy compound | EP | 1.47 | 1.47 | | 1.47 | 1.47 |
| | Phenolic stabilizer | | 0.29 | 0.29 | 0.29 | 0.29 | 0.29 |
| | Phosphorus-containing stabilizer | | 0.15 | 0.15 | 0.14 | 0.15 | 0.15 |
| | Mold releasing agent | | 0.44 | 0.44 | 0.43 | 0.44 | 0.44 |
| | Carbon black masterbatch | | | | | | |
| | Colorant | DY1 | 0.16 | 0.16 | 0.16 | 0.16 | 0.16 |
| | | DY2 | 0.19 | 0.19 | 0.19 | 0.19 | 0.19 |
| | | DY3 | | | | | |
| | | DY4 | | | | | |
| | | PG | | | | | |
| Properties of transmissive resin member | SCI ΔE (ASTM 155, 500 h) | — | 0.7 | 0.6 | 0.7 | 1.5 | 2.9 |
| | SCE ΔE (ASTM 155, 500 h) | — | 3.6 | 2.9 | 3.2 | 5.9 | 6.8 |
| | Transmittance at 1.5 mm thickness | % | 76 | 69 | 68 | 62 | 35 |
| | Tensie strength | MPa | 134 | 138 | 139 | 145 | 145 |
| | Retention of tensile strength after 100-h PCT treatment | % | 59 | 66 | <50 | 68 | 73 |
| | Flexural strength | MPa | 194 | 202 | 203 | 208 | 208 |
| | Flexural modulus | MPa | 9100 | 9200 | 9200 | 9300 | 9400 |
| | DTUL (1.8 MPa) | ° C. | 190 | 194 | 195 | 198 | 203 |
| Weld strength (150 W-900 mm/s, 5 laps) | | N | 1542 | 1680 | 1570 | 1919 | 1218 |
| Weld strength (150 W-900 mm/s, 20 laps) | | N | — | — | — | — | — |

TABLE 4

| | | | Example 6 | Example 7 | Example 8 | Example 9 | Example 10 |
|---|---|---|---|---|---|---|---|
| Chemical composition of transmissive resin member | Polyester resin | PBT | 60 | 60 | 60 | 60 | 70 |
| | | PET | | | | 40 | 30 |
| | Polycarbonate resin | PC | 30 | 30 | 20 | | |
| | Aromatic vinyl-based resin | HIPS | | 10 | 20 | | |
| | | AS | 10 | | | | |
| | Glass fiber | GF | 44.03 | 44.01 | 44.01 | 44.03 | 44.03 |
| | Epoxy compound | EP | 1.47 | 1.47 | 1.47 | 1.47 | 1.47 |
| | Phenolic stabilizer | | 0.29 | 0.29 | 0.29 | 0.29 | 0.29 |
| | Phosphorus-containing stabilizer | | 0.15 | 0.15 | 0.15 | 0.15 | 0.15 |
| | Mold releasing agent | | 0.44 | 0.44 | 0.44 | 0.44 | 0.44 |
| | Carbon black masterbatch | | | | | | |
| | Colorant | DY1 | | 0.16 | 0.16 | | |
| | | DY2 | 0.13 | 0.19 | 0.19 | 0.13 | 0.13 |
| | | DY3 | 0.15 | | | 0.15 | 0.15 |
| | | DY4 | 0.12 | | | 0.12 | 0.12 |
| | | PG | | | | | |
| Properties of transmissive resin member | SCI ΔE (ASTM 155, 500 h) | — | 1.0 | 1.0 | 1.6 | 2.7 | 4.1 |
| | SCE ΔE (ASTM 155, 500 h) | — | 4.6 | 4.2 | 9.4 | 5.8 | 9.0 |
| | Transmittance at 1.5 mm thickness | % | 74 | 70 | 56 | 25 | 22 |
| | Tensie strength | MPa | 138 | 137 | 134 | 146 | 147 |
| | Retention of tensile strength after 100-h PCT treatment | % | 62 | 65 | 77 | <50 | <50 |
| | Flexural strength | MPa | 194 | 215 | 196 | 219 | 218 |
| | Flexural modulus | MPa | 9100 | 9300 | 9200 | 9400 | 9400 |
| | DTUL (1.8 MPa) | ° C. | 186 | 187 | 186 | 205 | 205 |
| Weld strength (150 W-900 mm/s, 5 laps) | | N | 1308 | 1295 | 1404 | x | x |
| Weld strength (150 W-900 mm/s, 20 laps) | | N | — | — | — | 2143 | 2012 |

TABLE 5

| | | | Comparative Example 1 | Comparative Example 2 | Comparative Example 3 | Comparative Example 4 |
|---|---|---|---|---|---|---|
| Chemical composition of transmissive resin member | Polyester resin | PBT | 100 | 70 | 70 | 70 |
| | | PET | | | | |
| | Polycarbonate resin | PC | | 30 | 30 | 30 |
| | Aromatic vinyl-based resin | HIPS | | | | |
| | | AS | | | | |
| | Glass fiber | GF | 43.95 | 44.44 | | |
| | Epoxy compound | EP | 1.46 | | | |
| | Phenolic stabilizer | | 0.29 | 0.30 | 0.20 | 0.20 |
| | Phosphorus-containing stabilizer | | | | 0.10 | 0.10 |
| | Mold releasing agent | | 0.44 | 0.44 | 0.30 | 0.30 |
| | Carbon black masterbatch | | | 2.96 | | |
| | Colorant | DY1 | 0.16 | | | 0.11 |
| | | DY2 | 0.19 | | | 0.13 |
| | | DY3 | | | | |
| | | DY4 | | | | |
| | | PG | | | 0.25 | |
| Properties of transmissive resin member | SCI ΔE (ASTM 155, 500 h) | — | 7.2 | 0.6 | 0.5 | 0.8 |
| | SCE ΔE (ASTM 155, 500 h) | — | 13.5 | 2.8 | 2.8 | 3.3 |
| | Transmittance at 1.5 mm thickness | % | 28 | 0 | <20 | 75 |
| | Tensie strength | MPa | 142 | 135 | <100 | <100 |
| | Retention of tensile strength after 100-h PCT treatment | % | 82 | <50 | <50 | <50 |
| | Flexural strength | MPa | 209 | 201 | <100 | <100 |
| | Flexural modulus | MPa | 9000 | 9100 | <4000 | <4000 |
| | DTUL (1.8 MPa) | ° C. | 207 | 194 | <70 | <70 |
| Weld strength (150 W-900 mm/s, 5 laps) | | N | x | x | x | 1475 |
| Weld strength (150 W-900 mm/s, 20 laps) | | N | 1861 | x | — | — |

TABLE 6

| | | | Absorptive resin member |
|---|---|---|---|
| Chemical composition of absorptive resin member | Polyester resin | PBT | 100 |
| | | PET | |
| | Polycarbonate resin | PC | |
| | Aromatic vinyl-based resin | HIPS | |
| | | AS | |
| | Glass fiber | GF | 43.95 |
| | Epoxy compound | EP | 1.46 |
| | Phenolic stabilizer | | 0.29 |
| | Phosphorus-containing stabilizer | | |
| | Mold releasing agent | | 0.44 |
| | Carbon black masterbatch | | 2.86 |
| | Colorant | DY1 | |
| | | DY2 | |
| | | DY3 | |
| | | DY4 | |
| | | PG | |

As is clear from the results summarized in Tables 3 to 5, the resin composition of this invention were found to demonstrate large laser weld strength, color fading effectively suppressed even after weathering test, high deflection temperature under load, and high heat resistance (Examples 1 to 10). The obtained test specimens were also found to excel in various mechanical properties. Moreover, blending of the polycarbonate resin with the polyester resin was found to elevate laser transmittance of the formed article, and to achieve good laser weldability (Examples 1 to 8).

In contrast, the case free of the thermoplastic resin (B) that demonstrates a glass transition temperature higher by 15 to 150° C. than that of the polybutylene terephthalate resin (A) (Comparative Example 1) was found to cause color fading after the weathering test. The cases that contain carbon black or organic pigment, in place of the dye (Comparative Examples 2, 3) were found to excel in the weatherability, but resulted in poor heat resistance. Also the laser transmittance was found to degrade, and therefore the laser weldability was poor.

The case free of the glass fiber (Comparative Example 4) was found to result in poor heat resistance, and also in poor mechanical strength.

REFERENCE SIGNS LIST

21, 22 hole
23, 24 measurement jig
25, 26 measurement jig

The invention claimed is:

1. A resin composition, comprising:

per 100 parts by mass of a resin component that comprises 50 to 95% by mass of a polybutylene terephthalate resin (A), and 5 to 50% by mass of a thermoplastic resin (B) that demonstrates a glass transition temperature, measured with a differential scanning calorimeter, higher by 15 to 150° C. than a glass transition temperature of the polybutylene terephthalate resin (A);

0.001 to 5 parts by mass of a dye;

5 to 100 parts by mass of an inorganic filler; and no more than 3 ppm by mass of nigrosin, wherein the dye is a black dye composition appearing black and comprising a first chromatic coloring component and a second chromatic coloring component, wherein the first and second chromatic coloring component are independently an azomethine, anthraquinone, or perinone, wherein, when the resin composition is formed into 1.5 mm thick and measured before and after 500-hour treatment in compliance with ASTM 155-1, the resin composition demonstrates a color difference ΔE of less than 5 in specular component excluded (SCE) mode, wherein, when the resin composition is formed into 1.5 mm thick, and measured at a wavelength of 1064 nm, the resin composition demonstrates a light transmittance of 20% or larger.

2. The resin composition of claim 1, wherein the thermoplastic resin (B) comprises a polycarbonate resin.

3. The resin composition of claim 1, further comprising:

a reactive compound.

4. The resin composition of claim 3, wherein the reactive compound comprises an epoxy compound.

5. The resin composition of claim 1, which demonstrates a deflection temperature under load, measured in compliance with JIS 7191, of 100° C. or higher.

6. The resin composition of claim 1, which demonstrates a color difference ΔE in the SCI mode, when formed into 1.5 mm thick and measured before and after 500-hour treatment in compliance with ASTM 155-1, in a range of from 0.1 to 4.5.

7. The resin composition of claim 1, wherein the inorganic filler comprises a glass fiber.

8. The resin composition of claim 1, wherein the dye is a transmissive coloring matter.

9. The resin composition of claim 8, which demonstrates a transmittance at 1064 nm wavelength, when formed into 1.5 mm thick, of 50% or larger.

10. The resin composition of claim 8, which is suitable for Galvano-scanning laser welding.

11. A kit, comprising:

the resin composition of claim 8; and a light-absorptive resin composition comprising a thermoplastic resin and a light-absorptive coloring matter.

12. A formed article, formed of the resin composition of claim 1.

13. A UV exposed article, formed of a resin composition of claim 8, or formed of a kit comprising the resin composition and a light-absorptive resin composition comprising a thermoplastic resin and a light-absorptive coloring matter.

14. A UV exposed article of claim 13, which is a car-borne camera component, a case of an in-vehicle and/or outside-vehicle millimeter-wave radar, a case of electric parking brake, or a case of sensor casing.

15. A car-borne camera component, formed of a resin composition of claim 8, or formed of a kit comprising the resin composition and a light-absorptive resin composition comprising a thermoplastic resin and a light-absorptive coloring matter.

16. A car-borne camera module, comprising:

the car-borne camera component of claim 15.

17. A method for manufacturing a formed article, the method comprising:

laser-welding a formed article formed of the resin composition of claim 8 and a formed article formed of a light-absorptive resin composition comprising a thermoplastic resin and a light-absorptive coloring matter.

18. The method of claim 17, wherein the laser welding is Galvano-scanning laser welding.

19. The resin composition of claim 8, which demonstrates a transmittance at 1064 nm wavelength, when formed into 1.5 mm thick, of 30% or larger.

20. The resin composition of claim 1, comprising no.

21. The resin composition of claim 1, having a resin component content in a range of from 60 to 80% by mass, based on total resin composition mass.

* * * * *